(12) United States Patent
Park et al.

(10) Patent No.: US 12,724,515 B2
(45) Date of Patent: Sep. 1, 2026

(54) VEHICLE DISPLAY APPARATUS AND CONTROL METHOD THEREOF

(71) Applicant: Samsung Display Co., Ltd., Yongin-si (KR)

(72) Inventors: Junhyeong Park, Yongin-si (KR); Kyungho Kim, Yongin-si (KR); Youngseok Seo, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/315,043

(22) Filed: Aug. 29, 2025

(65) Prior Publication Data

US 2026/0064230 A1 Mar. 5, 2026

(30) Foreign Application Priority Data

Sep. 5, 2024 (KR) ........................ 10-2024-0121130

(51) Int. Cl.
*G06F 3/042* (2006.01)
*B60K 35/10* (2024.01)
(Continued)

(52) U.S. Cl.
CPC ............ *G06F 3/0425* (2013.01); *B60K 35/10* (2024.01); *B60K 35/223* (2024.01); *G06F 3/016* (2013.01);
(Continued)

(58) Field of Classification Search
CPC ....... G06F 3/016; G06F 3/0202; G09G 3/035; G09G 2380/10; B60K 35/25; B60K 35/81; B60K 2360/1438
See application file for complete search history.

(56) References Cited

U.S. PATENT DOCUMENTS 7,382,357 B2 * 6/2008 Panotopoulos ....... G06F 3/0238 345/169
9,239,650 B2 1/2016 Lee
(Continued)

FOREIGN PATENT DOCUMENTS

JP 2018-31792 A 3/2018
KR 10-1550601 B1 9/2015
(Continued)

OTHER PUBLICATIONS

International Search Report issued in corresponding PCT Application No. PCT/KR2025/013485, dated Dec. 2, 2025 (3 pages).

*Primary Examiner* — Patrick F Marinelli
(74) *Attorney, Agent, or Firm* — Womble Bond Dickinson (US) LLP

(57) ABSTRACT

A vehicle display apparatus includes: a camera; a stretchable display panel including a touch sensor; a mechanical unit including at least one pin moving in a perpendicular direction with respect to a rear surface of the display panel; and a processor configured to: control operations of the display panel and the mechanical unit, identify a user touching the display panel, and determine a driver's seat or a passenger's seat control mode; in the driver's seat and passenger's seat control modes, output a driving control signal for controlling movement of the at least one pin; output an operation control signal for performing a function corresponding to a touch of the user input to a protruding area of the display panel according to the movement of the at least one pin; and in the driver's seat control mode, output a feedback control signal for feedback output set for performing the function.

16 Claims, 28 Drawing Sheets

(51) Int. Cl.

| | |
|---|---|
| ***B60K 35/22*** | (2024.01) |
| ***G06F 3/01*** | (2006.01) |
| ***G06F 3/041*** | (2006.01) |
| ***G06V 20/59*** | (2022.01) |
| ***G09G 3/00*** | (2006.01) |

(52) U.S. Cl.

CPC ........ *G06F 3/04166* (2019.05); *G06V 20/597* (2022.01); *G09G 3/035* (2020.08); *B60K 2360/1438* (2024.01); *B60K 2360/21* (2024.01); *G09G 2354/00* (2013.01); *G09G 2380/10* (2013.01)

(56) References Cited

U.S. PATENT DOCUMENTS

| | | | | |
|---|---|---|---|---|
| 11,194,413 | B2 | 12/2021 | Hong et al. | |
| 11,592,981 | B2 * | 2/2023 | Matsushita | G06F 3/041 |
| 11,775,098 | B2 | 10/2023 | Wu et al. | |
| 12,353,707 | B2 * | 7/2025 | Chen | B60K 35/22 |
| 2005/0030292 | A1 * | 2/2005 | Diederiks | G06F 3/04886 345/173 |
| 2006/0238510 | A1 * | 10/2006 | Panotopoulos | G06F 3/0238 345/168 |
| 2009/0002328 | A1 * | 1/2009 | Ullrich | G09B 21/004 345/173 |
| 2011/0261021 | A1 * | 10/2011 | Modarres | G06F 3/016 345/177 |
| 2017/0228035 | A1 * | 8/2017 | Irzyk | G06V 40/28 |
| 2018/0304749 | A1 | 10/2018 | Cho et al. | |
| 2020/0210003 | A1 * | 7/2020 | Hong | G06V 40/12 |
| 2021/0333900 | A1 | 10/2021 | Cho et al. | |
| 2022/0350480 | A1 * | 11/2022 | Matsushita | G06F 3/14 |
| 2023/0252117 | A1 * | 8/2023 | Guo | B60K 35/10 713/186 |
| 2024/0047473 | A1 | 2/2024 | Choi et al. | |
| 2024/0385746 | A1 * | 11/2024 | Chen | B60K 35/22 |
| 2025/0214441 | A1 * | 7/2025 | Kim | B60K 35/656 |
| 2025/0332916 | A1 * | 10/2025 | Kamiya | B60K 35/265 |
| 2026/0056656 | A1 * | 2/2026 | Chen | B60K 35/22 |
| 2026/0057849 | A1 * | 2/2026 | Chen | B60K 35/215 |
| 2026/0064230 | A1 * | 3/2026 | Park | B60K 35/223 |

FOREIGN PATENT DOCUMENTS

| | | | | |
|---|---|---|---|---|
| KR | 102080725 | B1 * | 2/2020 | B60K 35/00 |
| KR | 10-2020-0095585 | A | 8/2020 | |
| KR | 10-2212794 | B1 | 2/2021 | |
| KR | 10-2309412 | B1 | 10/2021 | |
| KR | 10-2024-0020327 | A | 2/2024 | |
| KR | 102694215 | B1 * | 8/2024 | G06F 3/167 |

* cited by examiner

VEHICLE DISPLAY APPARATUS AND CONTROL METHOD THEREOF

CROSS-REFERENCE TO RELATED APPLICATION

The present application claims priority to and the benefit of Korean Patent Application No. 10-2024-0121130, filed on Sep. 5, 2024, in the Korean Intellectual Property Office, the entire disclosure of which is incorporated herein by reference.

BACKGROUND

1. Field

Aspects of some embodiments relate to a display apparatus.

2. Description of the Related Art

With the development of display apparatuses visually displaying electrical signals, various display apparatuses having excellent characteristics such as small thickness, light weight, and low power consumption have been introduced. For example, flexible display apparatuses capable of being folded or rolled have been introduced. Recently, research and development of stretchable display apparatuses having shapes that may variously change have been actively conducted.

The above information disclosed in this Background section is only for enhancement of understanding of the background and therefore the information discussed in this Background section does not necessarily constitute prior art.

SUMMARY

Aspects of some embodiments relate to a display apparatus, and for example, to an electronic device including a stretchable display apparatus, and a control method thereof.

Aspects of some embodiments include a display apparatus in which control of an in-vehicle device may be performed without interfering with driving of a driver.

Additional aspects will be set forth in part in the description which follows and, in part, will be apparent from the description, or may be learned by practice of the presented embodiments.

According to some embodiments of the present disclosure, a vehicle display apparatus includes at least one camera, a display panel that is stretchable and includes a touch sensor, a mechanical unit including at least one pin moving in a perpendicular direction with respect to a rear surface of the display panel, and a processor configured to control operations of the display panel and the mechanical unit. According to some embodiments, the processor may be further configured to identify a user touching the display panel, based on an image signal obtained from the at least one camera, and determine a driver's seat control mode or a passenger's seat control mode according to the identified user. In the driver's seat control mode and the passenger's seat control mode, the processor may be further configured to output a driving control signal for controlling movement of the at least one pin of the mechanical unit, and output an operation control signal for performing a function corresponding to a touch of the user input to a protruding area of the display panel according to the movement of the at least one pin. In the driver's seat control mode, the processor may be further configured to further output a feedback control signal for feedback output set for the performing of the function.

According to some embodiments, the protruding area may include a central area having a greatest height and a peripheral area around the central area, wherein the peripheral area may have a height gradually decreasing from the central area to include an inclining surface.

According to some embodiments, the processor may be further configured to output the operation control signal for controlling on or off of the function in response to a touch on the central area and output the operation control signal for controlling a range of the function in response to dragging on the peripheral area.

According to some embodiments, the function may include at least one of temperature control, volume control, or radio frequency control.

According to some embodiments, the mechanical unit may include a single pin located according to the protruding area.

According to some embodiments, the mechanical unit may include at least one first pin located according to the central area of the protruding area, and a plurality of second pins located according to the peripheral area, wherein a moving distance of the at least one first pin may be greater than a moving distance of the plurality of second pins.

According to some embodiments, the at least one camera may be arranged above the display panel or below the display panel.

According to some embodiments, the touch sensor may include at least one of a capacitive touch sensor, a resistive touch sensor, an acoustic wave touch sensor, an infrared touch sensor, or a pressure touch sensor.

According to some embodiments, the function may further include image reproduction.

According to some embodiments, in the passenger's seat control mode, based on the function corresponding to the touch of the user input to the protruding area of the display panel being the image reproduction, the processor may be further configured to output the driving control signal for controlling the movement of the at least one pin of the mechanical unit, and the display panel may be changed to provide a first display area inclined towards a driver's seat and a second display area inclined towards a passenger's seat, according to the movement of the at least one pin.

According to some embodiments of the present disclosure, a control method of a vehicle display apparatus, wherein the vehicle display apparatus includes at least one camera, a display panel that is stretchable and includes a touch sensor, and a mechanical unit including at least one pin moving in a perpendicular direction with respect to a rear surface of the display panel, the control method includes identifying a user touching the display panel, based on an image signal obtained from the at least one camera, and determining a driver's seat control mode or a passenger's seat control mode according to the identified user, in the driver's seat control mode, outputting a driving control signal for controlling movement of the at least one pin of the mechanical unit, and in the driver's seat control mode, outputting an operation control signal for performing a function corresponding to a touch of the user input to a protruding area of the display panel according to the movement of the at least one pin, and a feedback control signal for feedback output set for the performing of the function.

According to some embodiments, in the passenger's seat control mode, the feedback control signal may not be output.

According to some embodiments, the protruding area may include a central area having a greatest height and a peripheral area around the central area, wherein the peripheral area may have a height gradually decreasing from the central area to include an inclining surface.

According to some embodiments, the outputting of the operation control signal may include outputting the operation control signal for controlling on or off of the function in response to a touch on the central area and outputting the operation control signal for controlling a range of the function in response to dragging on the peripheral area.

According to some embodiments, the function may include at least one of temperature control, volume control, or radio frequency control.

According to some embodiments, the mechanical unit may include a single pin located according to the protruding area.

According to some embodiments, the mechanical unit may include at least one first pin located according to the central area of the protruding area, and a plurality of second pins located according to the peripheral area, wherein a moving distance of the at least one first pin may be greater than a moving distance of the plurality of second pins.

According to some embodiments, the at least one camera may be arranged above the display panel or below the display panel.

According to some embodiments, the touch sensor may include at least one of a capacitive touch sensor, a resistive touch sensor, an acoustic wave touch sensor, an infrared touch sensor, or a pressure touch sensor.

According to some embodiments, the function may further include image reproduction, and the control method may further include, in the passenger's seat control mode, based on the function corresponding to the touch of the user input to the protruding area of the display panel being the image reproduction, outputting the driving control signal for controlling the movement of the at least one pin of the mechanical unit, and providing an image according to user selection to a second display area of the display panel that is changed to provide a first display area inclined towards a driver's seat and the second display area inclined towards a passenger's seat, according to the movement of the at least one pin.

BRIEF DESCRIPTION OF THE DRAWINGS

The above and other aspects, features, and characteristics of certain embodiments will be more apparent from the following description taken in conjunction with the accompanying drawings, in which.

DETAILED DESCRIPTION

Figure 1:
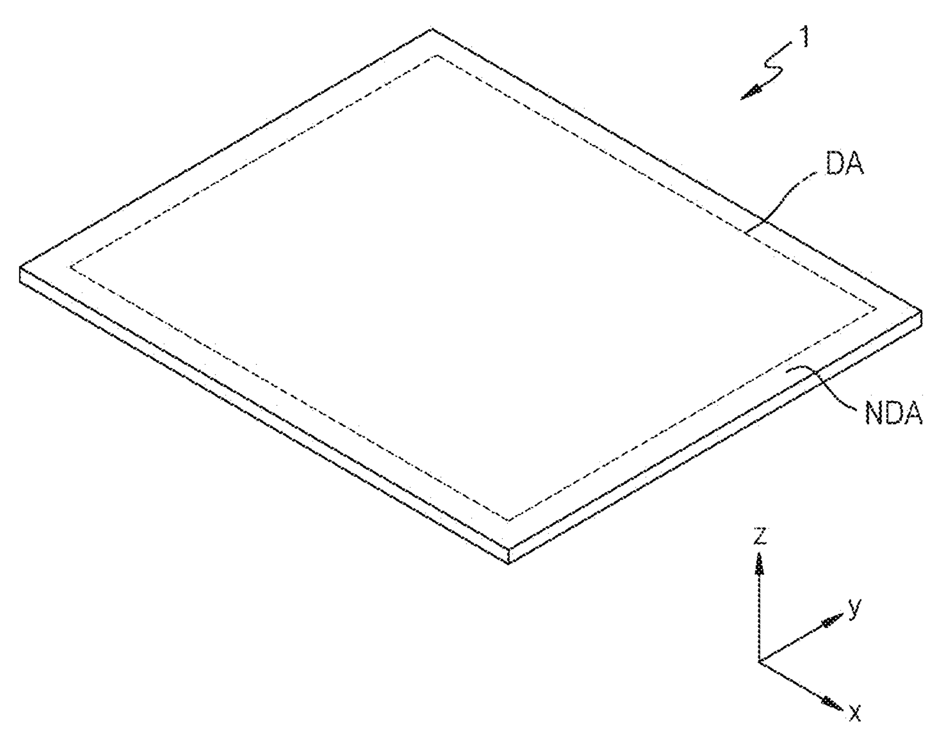
FIG. 1 is a perspective view schematically showing a display apparatus according to some embodiments.

Aspects of some embodiments according to the present disclosure may have various modifications and various embodiments, and specific embodiments are illustrated in the drawings and are described in more detail in the detailed description. Characteristics and features of the disclosure and methods of achieving the same will become apparent with reference to embodiments described in detail with reference to the drawings. However, embodiments according to the present disclosure are not limited to the embodiments described below, and may be implemented in various forms.

In the following embodiments, the terms "first" and "second" are not used in a limited sense and are used to distinguish one element from another element.

In the following embodiments, an expression used in the singular encompasses the expression of the plural, unless it has a clearly different meaning in the context.

In the following embodiments, it will be further understood that the terms "comprise" and/or "comprising" used herein specify the presence of stated features or elements, but do not preclude the presence or addition of one or more other features or elements.

It will be understood that when a layer, region, or element is referred to as being "formed on" another layer, area, or element, it can be directly or indirectly formed on the other layer, region, or element. That is, for example, intervening layers, regions, or elements may be present.

In the specification, "A and/or B" denotes only A, only B, or both A and B. Also, in the present specification, "at least one of A and B" denotes only A, only B, or both A and B.

According to embodiments, a case where X and Y are connected to each other may include, directly or indirectly, a case where X and Y are electrically connected to each other, a case where X and Y are functionally connected to each other, and a case where X and Y are physically connected to each other. Here, X and Y may be objects (for example, apparatuses, devices, circuits, wires, electrodes, terminals, conductive layers, or layers). Accordingly, such a connection is not limited to a certain connection relationship, for example, a connection relationship indicated in the drawings or detailed description, and may include connection relationships other than that indicated in the drawings or detailed description.

A case where X and Y are electrically connected to each other may include, for example, a case where X and Y are directly connected to each other and a case where one or more elements (e.g., a switch, a transistor, a capacitor, an inductor, a resistor, and a diode) enabling an electric connection between X and Y are connected between X and Y.

According to embodiments, an x direction, a y direction, and a z direction are not limited to directions in three axes on an orthogonal coordinate system, but may be interpreted in a broad sense including the three axes. For example, the x direction, the y direction, and the z direction may be perpendicular to one another, or may represent different directions that are not perpendicular to one another.

When a certain embodiment may be implemented differently, a specific process order may be performed differently from the described order. For example, two consecutively described processes may be performed substantially at the same time or performed in an order opposite to the described order.

In the drawings, for convenience of description, sizes of elements may be exaggerated or reduced. In other words, because sizes and thicknesses of elements in the drawings are arbitrarily illustrated for convenience of explanation, the disclosure is not necessarily limited thereto.

It will be understood that blocks in flowcharts or combinations of the flowcharts, according to embodiments, may be performed by computer program instructions. Because these computer program instructions may be loaded into a processor of a general-purpose computer, special purpose computer, or other programmable data processing apparatus, the instructions, which are executed via the processor of the computer or other programmable data processing apparatus generate means for implementing the functions specified in the flowchart block(s). The computer program instructions may be stored in a computer-executable or computer-readable memory capable of directing a computer or another programmable data processing apparatus to implement a function in a particular manner, and thus the instructions stored in the computer-executable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks shown in succession may in fact be executed substantially concurrently or the blocks may sometimes be executed in the reverse order, depending upon the functionality involved.

Here, the term "unit" used in the embodiments means a software component or hardware component such as a field-programmable gate array (FPGA) or an application-specific integrated circuit (ASIC), and performs a specific function. However, the term "unit" or "-er/or" is not limited to software or hardware. The "unit" or "-er/or" may be formed so as to be in an addressable storage medium, or may be formed so as to operate one or more processors. Thus, for example, the term "unit" or "-er/or" may refer to elements such as software components, object-oriented software elements, class components, and task elements, and may include processes, functions, attributes, procedures, subroutines, segments of program code, drivers, firmware, micro codes, circuits, data, a database, data structures, tables, arrays, or variables. A function provided by the elements and "units" or "-ers/ors" may be associated with the smaller number of elements and "units" or "-ers/ors", or may be divided into additional elements and "units" "-ers/ors". Furthermore, the elements and "units" or "-ers/ors" may be embodied to reproduce one or more central processing units (CPUs) in a device or security multimedia card.

Figure 2A:
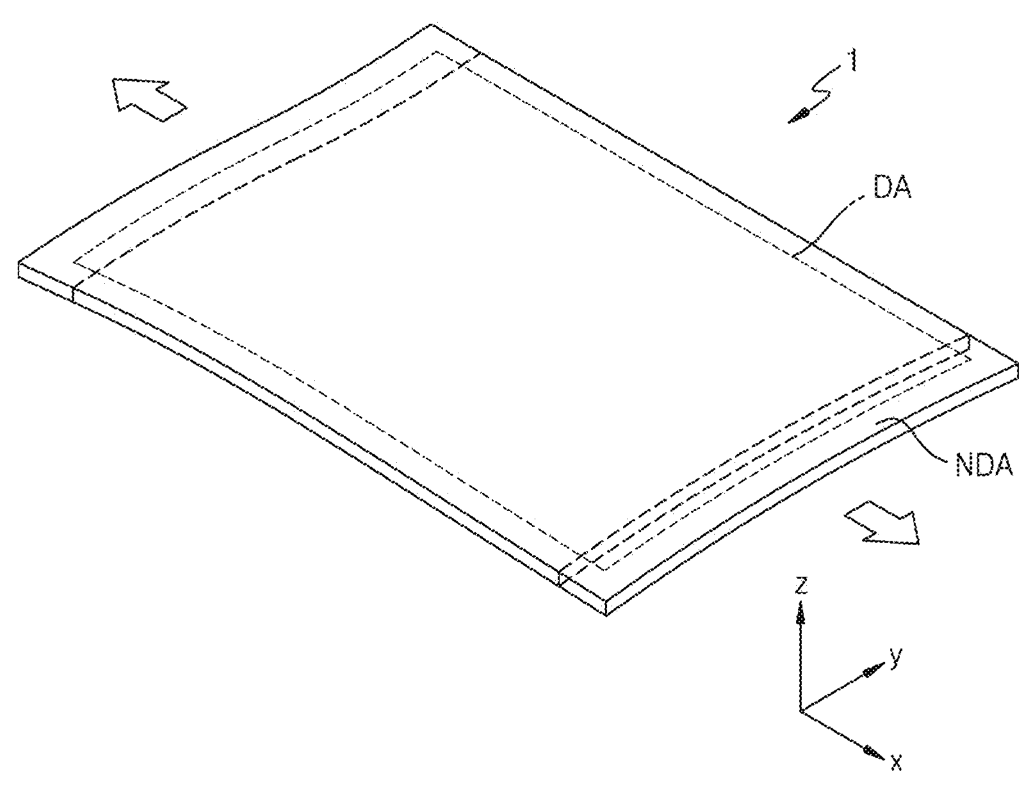
FIGS. 2A and 2B are perspective views showing the display apparatus of FIG. 1 being stretched in a first direction.
Figure 2B:
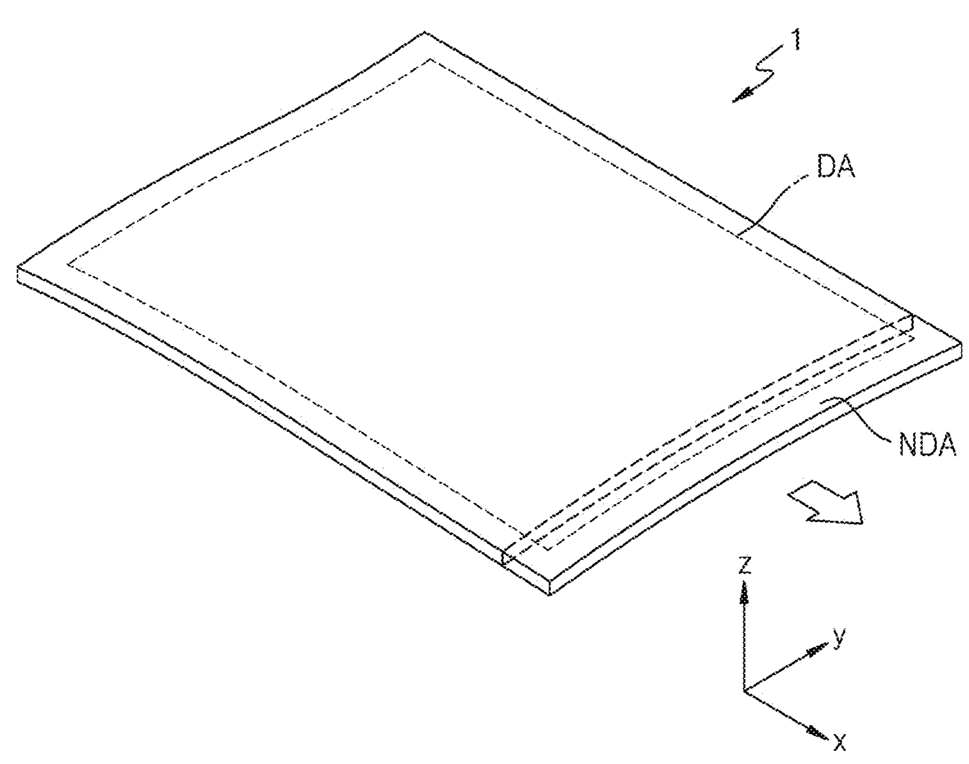
Figure 2C:
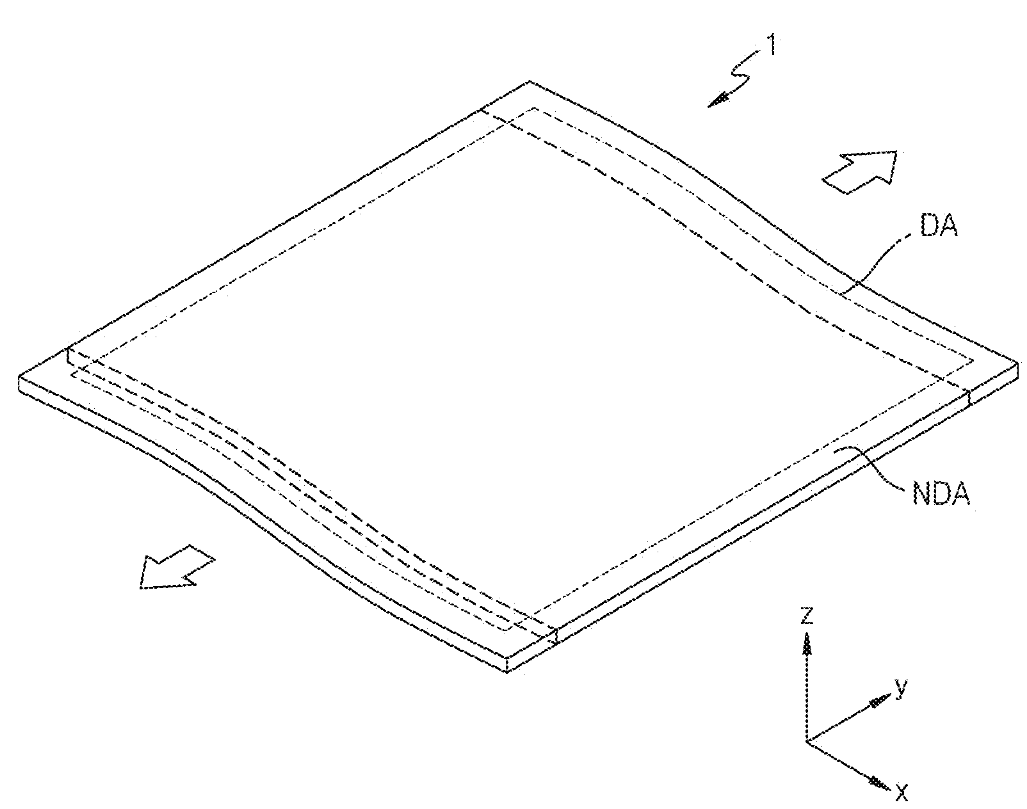
FIG. 2C is a perspective view showing the display apparatus of FIG. 1 being stretched in a second direction.
Figure 2D:
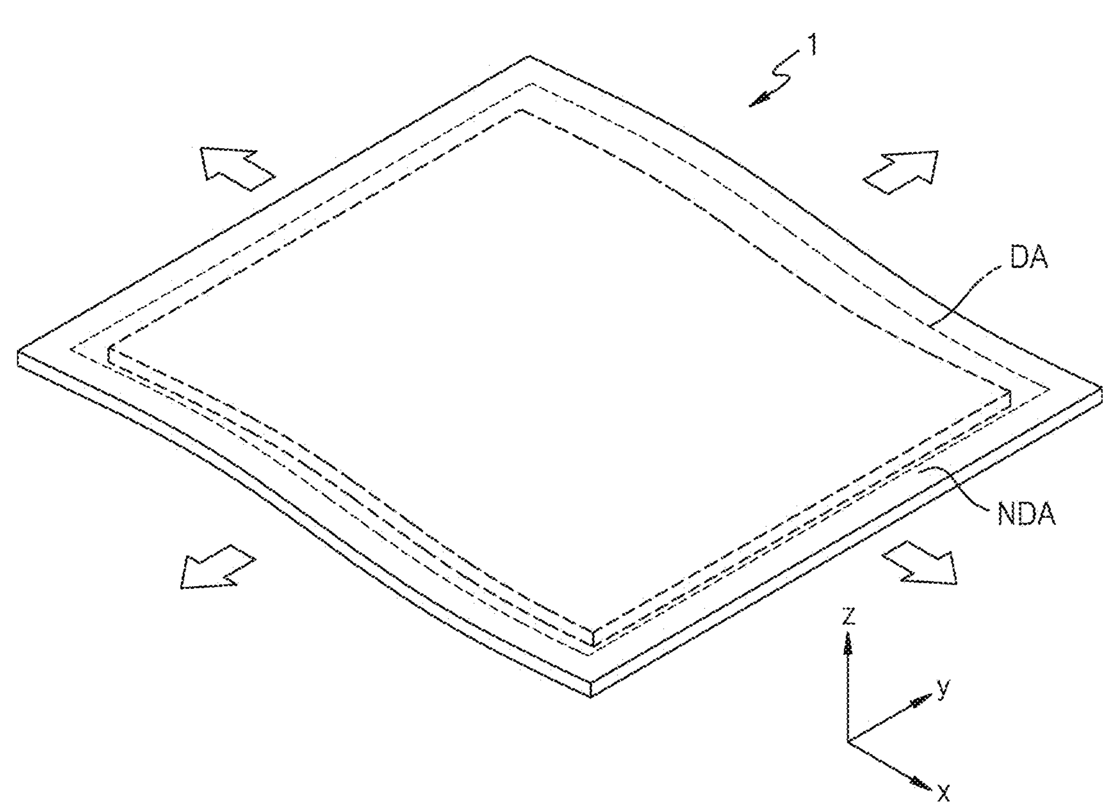
FIG. 2D is a perspective view showing the display apparatus of FIG. 1 being stretched in the first direction and the second direction.
Figure 2E:
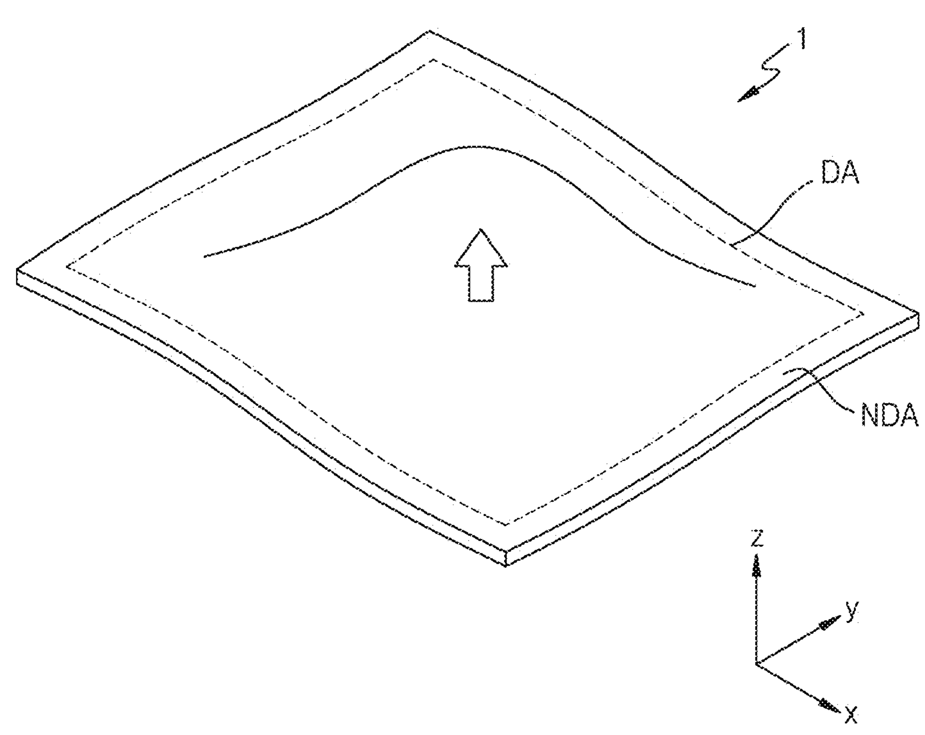
FIG. 2E is a perspective view showing the display apparatus of FIG. 1 being stretched in a third direction.

FIG. 1 is a perspective view schematically showing a display apparatus 1 according to some embodiments. FIGS. 2A and 2B are perspective views showing the display apparatus 1 of FIG. 1 being stretched in a first direction. FIG. 2C is a perspective view showing the display apparatus 1 of FIG. 1 being stretched in a second direction. FIG. 2D is a perspective view showing the display apparatus 1 of FIG. 1 being stretched in the first direction and the second direction. FIG. 2E is a perspective view showing the display apparatus 1 of FIG. 1 being stretched in a third direction.

Referring to FIG. 1, the display apparatus 1 may be a stretchable display apparatus that may expand or contract in various directions without damaging the display apparatus 1. The display apparatus 1 may include a display area DA and a non-display area NDA. The display area DA may include a plurality of pixels. The display apparatus 1 may provide a certain image by using light emitted from the plurality of pixels. The non-display area NDA may be arranged outside (e.g., in a periphery or outside a footprint of) the display area DA. The non-display area NDA may entirely surround the display area DA.

The display apparatus 1 may be stretched in the first direction (e.g., an x direction and/or a −x direction) by external force applied by an external object or a user without damaging the display apparatus 1. According to some embodiments, as shown in FIGS. 2A and 2B, the display area DA and/or the non-display area NDA of the display apparatus 1 may be stretched in the first direction (e.g., the x direction and/or the −x direction). For example, the display apparatus 1 may be stretched in the x direction and the −x direction as shown in FIG. 2A or may be stretched in the x direction or the −x direction while one side thereof is stationary. FIG. 2B illustrates an example in which the display apparatus 1 is stretched in the x direction while one side thereof is stationary.

The display apparatus 1 may be stretched in the second direction (e.g., a y direction and/or a −y direction) by external force applied by an external object or the user without damaging the display apparatus 1. According to some embodiments, as shown in FIG. 2C, the display area DA and/or the non-display area NDA of the display apparatus 1 may be stretched in the y direction and the −y direction. According to some embodiments, the display apparatus 1 may be stretched in the y direction or the −y direction while one side of the display apparatus 1 is stationary.

The display apparatus 1 may be stretched in a plurality of directions, e.g., the first direction (e.g., the x direction and/or the −x direction) and the second direction (e.g., the y direction and/or the −y direction), by external force applied by an external object or a part of body of a person. As shown in FIG. 2D, the display area DA and/or the non-display area NDA of the display apparatus 1 may be stretched in the ±x direction and the ±y direction.

The display apparatus 1 may be stretched in the third direction (e.g., a z direction or a −z direction) by external force applied by an external object or a part of body of a person. According to some embodiments, FIG. 2E illustrates a portion of the display apparatus 1, for example, a partial area of the display area DA, protruding in the z direction. According to some embodiments, a portion of the display apparatus 1, for example, a partial area of the display area DA, may protrude along the −z direction (or be dented along the z direction).

In FIGS. 2A to 2E, the display apparatus 1 is stretched in the first direction, the second direction, and/or the third direction, but embodiments according to the present disclosure are not limited thereto. According to some embodiments, the display apparatus 1 may be variously transformed in an atypical shape, for example, may be bent or twisted with two or more axes.

Figure 3:
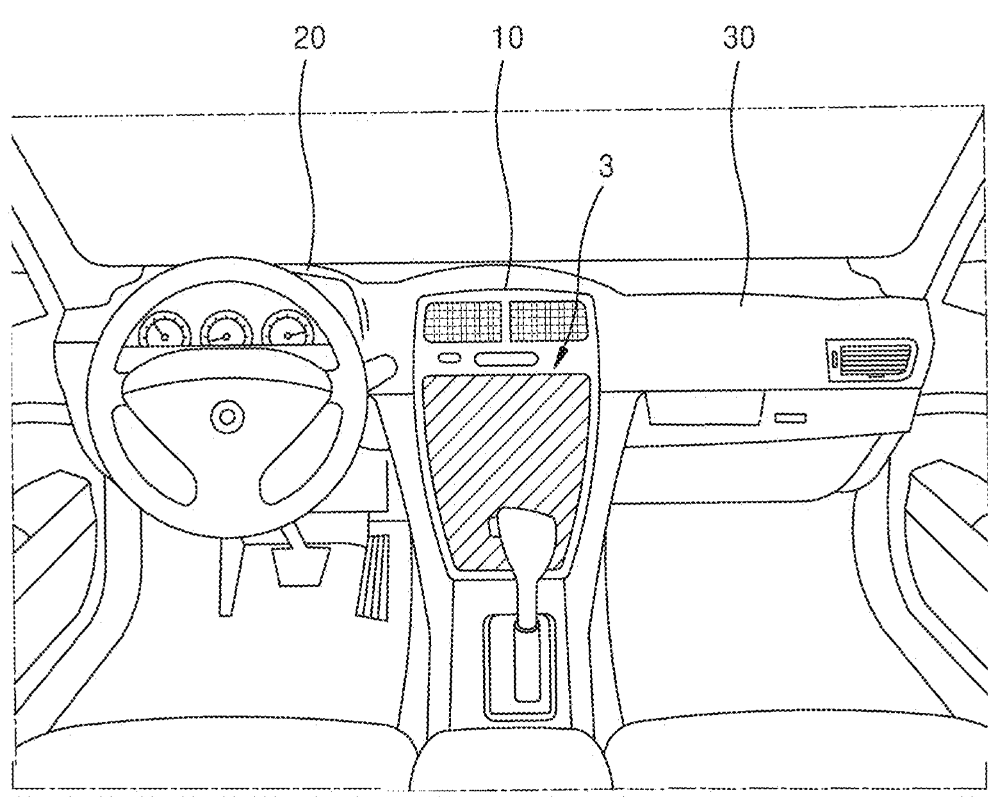
FIG. 3 is a perspective view schematically showing a vehicle electronic device including a stretchable display apparatus, according to some embodiments.

FIG. 3 is a perspective view schematically showing a vehicle electronic device including a stretchable display apparatus, according to some embodiments.

As shown in FIG. 3, a dashboard in a vehicle may include a center fascia 10, a cluster 20 (panel) of a driver's seat, and/or a board 30 of a passenger's seat. The display apparatus 1 according to some embodiments may stretch in various directions and thus may be used for at least one of the center fascia 10, the cluster 20, or the board 30 without being limited by a shape of an internal frame of the vehicle. Configurations of the inside of the vehicle and dashboard shown in FIG. 3 are only examples, and an internal configuration of the vehicle is not limited thereto.

The display apparatus 1 according to some embodiments may be applied to a vehicle display apparatus 3, as the vehicle electronic device. The vehicle display apparatus 3 may be a center information display (CID) implemented in the center fascia 10. The center fascia 10 is a center area of the dashboard that isolates the inside of the vehicle from an engine compartment. The vehicle display apparatus 3 may be a display apparatus for displaying and controlling operating states of various devices in the vehicle, such as audio, video, navigation (AVN), an air conditioner, a heater, and the like of the vehicle. The vehicle display apparatus 3 may display moving images such as digital multimedia broadcasting (DMB), movies, and the like.

In FIG. 3, the center fascia 10, the cluster 20, and the board 30 are separated from each other, but embodiments according to the present disclosure are not limited thereto. According to some embodiments, two or more of the cluster 20, the center fascia 10, and the board 30 may be integrated with each other. For example, the vehicle display apparatus 3 may be integrated with the cluster 20 and/or the board 30 by extending from the center fascia 10 to the cluster 20 and/or the board 30.

Figure 4:
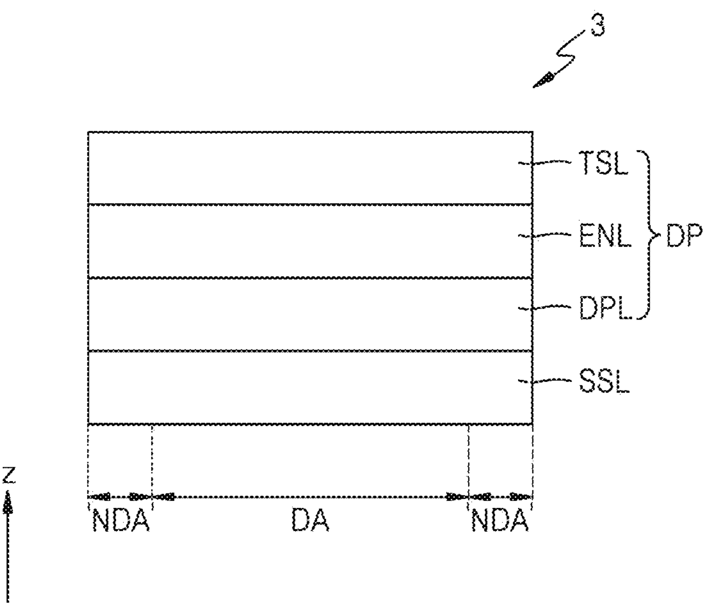
FIG. 4 is a cross-sectional view schematically showing a vehicle display apparatus according to some embodiments.
Figure 5:
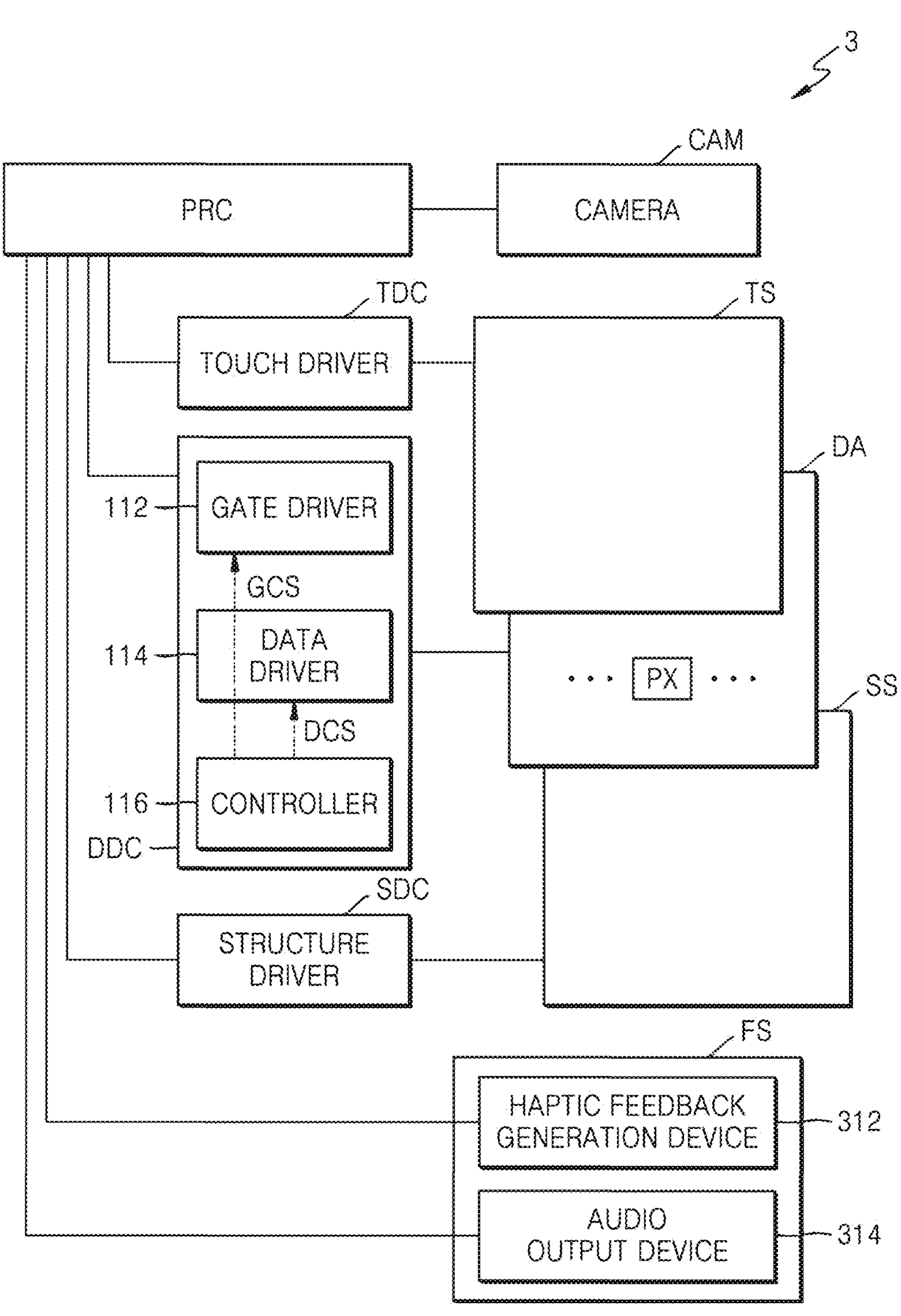
FIG. 5 is a diagram schematically showing a vehicle display apparatus according to some embodiments.
Figure 6:
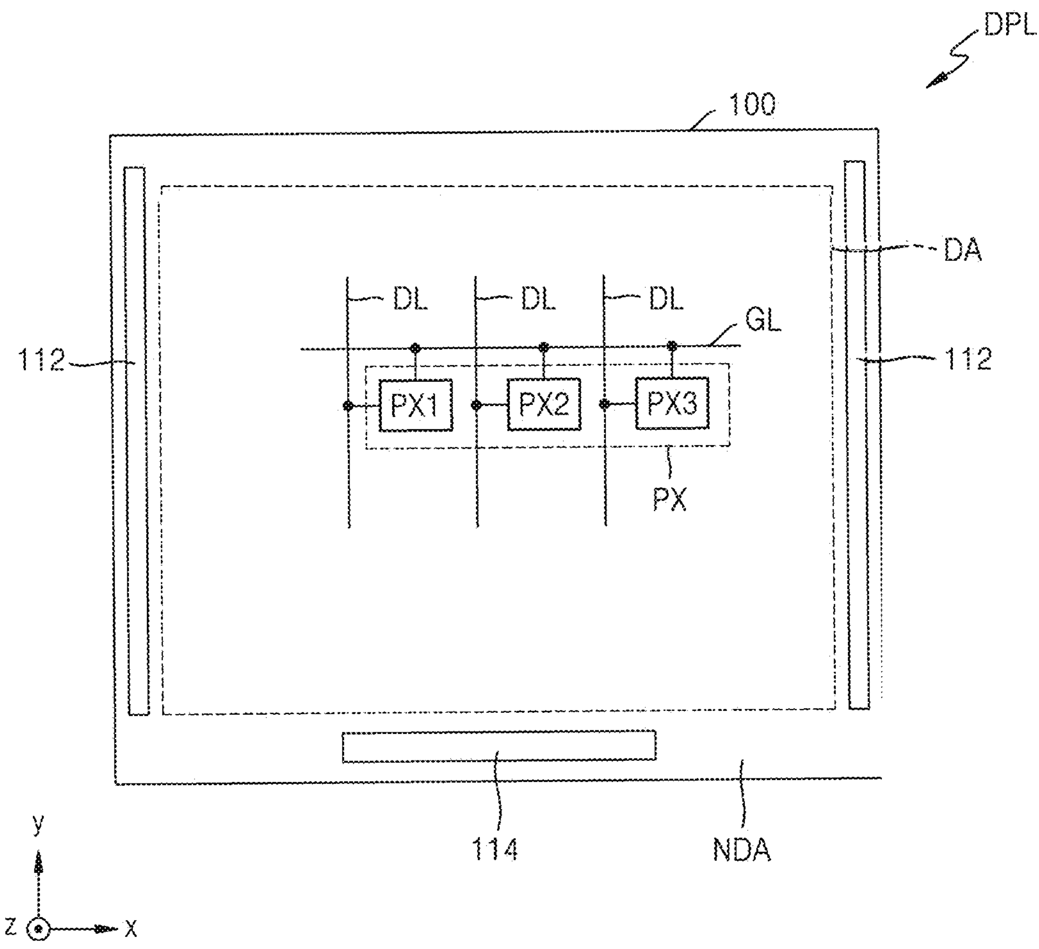
FIG. 6 is a diagram schematically showing a display layer according to some embodiments.

FIG. 4 is a cross-sectional view schematically showing the vehicle display apparatus 3 according to some embodiments. FIG. 5 is a diagram schematically showing the vehicle display apparatus 3 according to some embodiments. FIG. 6 is a diagram schematically showing a display layer DPL according to some embodiments.

Referring to FIG. 4, the vehicle display apparatus 3 may include a display panel DP and a mechanical unit SSL below the display panel DP. The display panel DP may include the display layer DPL, an encapsulation layer ENL, and a touch input layer TSL. The display panel DP may be a stretchable display panel. For elasticity of the display panel DP, the display layer DPL, the encapsulation layer ENL, and the touch input layer TSL may include an elastic material. The display area DA and the non-display area NDA, which respectively correspond to the display area DA and the non-display area NDA of FIG. 1, may be defined in the display panel DP.

A plurality of pixels may be arranged in the display layer DPL. As shown in FIG. 6, the display layer DPL may include a substrate 100 and a plurality of pixels PX may be arranged in the display area DA of the substrate 100. According to some embodiments, the pixel PX may include a plurality of sub-pixels configured to emit light of different colors.

The plurality of sub-pixels may include a first sub-pixel PX1 configured to emit light of a first color, a second sub-pixel PX2 configured to emit light of a second color, and a third sub-pixel PX3 configured to emit light of a third color. For example, the first sub-pixel PX1 may be a red pixel, the second sub-pixel PX2 may be a green pixel, and the third sub-pixel PX3 may be a blue pixel. The first sub-pixel PX1, the second sub-pixel PX2, and the third sub-pixel PX3 may each include a pixel circuit and a light-emitting element (display element) electrically connected to the pixel circuit. The pixel circuit may include a plurality of transistors and at least one capacitor, and may be a pixel driving circuit unit configured to control driving of the light-emitting element.

The pixel PX may be a smallest repetition unit of sub-pixels having a certain arrangement. The plurality of sub-pixels may realize an image by being arranged in any one of various forms, such as a stripe arrangement, a Pentile® arrangement, a diamond arrangement, and a mosaic arrangement. According to some embodiments, it may be understood that a pixel or a sub-pixel denote a light-emitting element, and an arrangement structure of sub-pixels is an arrangement structure of light-emitting elements. Hereinafter, an arrangement structure of sub-pixels may denote an arrangement structure of light-emitting elements, and light emission of a pixel or sub-pixel may denote light emission of a light-emitting element.

A plurality of gate lines GL and a plurality of data lines DL may be arranged in the display area DA of the substrate 100. Each sub-pixel may be connected to at least one corresponding gate line GL from among the plurality of gate lines GL, and a corresponding data line DL from among the plurality of data lines DL.

The gate lines GL may each extend in an x direction (a row direction) and be connected to the pixels PX located in a same row. The gate lines GL may each be configured to transmit a gate signal to the pixels PX in a same row. The data lines DL may each extend in a y direction (a column direction) and be connected to the sub-pixels located in a same column. The data lines DL may each be configured to transmit a data signal to each of the sub-pixels in a same column, in synchronization with the gate signal.

In FIG. 6, the pixel PX is connected to one gate line GL, but this is only an example, and the pixel PX may be connected to two or more gate lines GL.

The encapsulation layer ENL may be located on the light-emitting element and arranged to cover the display area DA and the non-display area NDA.

According to some embodiments, the encapsulation layer ENL may be a thin-film encapsulation layer including an inorganic encapsulation layer and/or an organic encapsulation layer. According to some embodiments, the encapsulation layer ENL may have a structure in which an inorganic encapsulation layer including an inorganic insulating material, an organic encapsulation layer including an organic insulating material, and an inorganic encapsulation layer including an inorganic insulating material are stacked on each other. According to some embodiments, the encapsulation layer ENL may include an organic material such as resin and may be a single layer including the above-described organic material. According to some embodiments, the encapsulation layer ENL may include urethane epoxy acrylate. The encapsulation layer ENL may include a photosensitive material, for example, photoresist.

According to some embodiments, the encapsulation layer ENL may include a sealing substrate. The sealing substrate may be provided to face a substrate where a pixel is arranged, with a light-emitting element therebetween. A gap may be present between the sealing substrate and the light-emitting element.

The touch input layer TSL may be located on the encapsulation layer ENL. The touch input layer TSL may include a touch sensor TS of FIG. 5. According to some embodiments, the touch sensor TS may include at least one of a capacitive touch sensor, a resistive touch sensor, an acoustic wave touch sensor, an infrared touch sensor, or a pressure touch sensor. According to some embodiments, the touch sensor TS may be directly located on the encapsulation layer ENL, and in this case, an adhesive layer such as an optically clear adhesive (OCA) may not be provided between the touch sensor TS and the encapsulation layer ENL. According to some embodiments, the touch sensor TS may be formed separately on a touch substrate and then combined on the encapsulation layer ENL through an adhesive layer, such as OCA. The display panel DP may be integrated with a touch panel and used as an output device and/or an input device.

The mechanical unit SSL may be located below the display panel DP. The mechanical unit SSL may be located below the substrate 100 of FIG. 6 of the display layer DPL. The mechanical unit SSL may include at least one stretching structure SS of FIG. 5 moving in a direction perpendicular to a rear surface of the display panel DP. The stretching structure SS may move linearly in a direction towards the rear surface of the display panel DP (hereinafter, referred to as a protruding direction) and in a direction away from the rear surface (hereinafter, referred to as a returning direction).

As shown in FIG. 5, the vehicle display apparatus 3 may include a display driver DDC configured to control the pixels PX of the display area DA, a touch driver TDC configured to control the touch sensor TS, a structure driver SDC configured to control the stretching structure SS, a camera CAM, and a processor PRC. The vehicle display apparatus 3 may further include a feedback system FS.

The display driver DDC may drive the pixels PX of the display area DA under control by the processor PRC. The plurality of pixels PX may display an image signal received from the display driver DDC. The display driver DDC may include a gate driver 112, a data driver 114, and a controller 116.

The gate driver 112 may be connected to the plurality of gate lines GL, and configured to generate the gate signal in response to a gate control signal GCS from the controller 116 and sequentially supply the same to the gate lines GL. In FIG. 6, two gate drivers 112 that face each other are arranged in the non-display area NDA, but embodiments according to the present disclosure are not limited thereto. According to some embodiments, one gate driver 112 may be arranged on one side of the non-display area NDA.

The data driver 114 may be connected to the plurality of data lines DL, and configured to supply the data signal to the data lines DL in response to a data control signal DCS from the controller 116. The data signal supplied to the data line DL may be supplied to a sub-pixel to which the gate signal has been supplied. The data driver 114 may be configured to convert image data or corrected image data, which has a gray scale, input from the controller 116, into a data signal in the form of a voltage or current.

The controller 116 may include an interface converting circuit and a timing controller. The controller 116 may be configured to receive an image signal from the processor PRC and output image data by converting a data format of the image signal according to an interface specification of the vehicle display apparatus 3. The controller 116 may generate the gate control signal CGS and the data control signal DCS, based on signals input from an external source (for example, the processor PRC), and supply the same to the gate driver 112 and the data driver 114. The gate control signal GCS output to the gate driver 112 may include a plurality of clock signals and a gate initiation signal. The data control signal DCS output to the data driver 114 may include a plurality of clock signals and a data initiation signal.

According to some embodiments, the display driver DDC may be provided in the non-display area NDA of the substrate 100. The gate driver 112, the data driver 114, and the controller 116 of the display driver DDC may be in the forms of individual integrated circuit chips or in the form of one integrated circuit chip, and arranged on a flexible printed circuit board (FPCB) electrically connected to a pad arranged on one side of the substrate 100.

According to some embodiments, a portion or all of the gate driver 112 may be directly formed in the non-display area NDA of the substrate 100, during a process of forming a transistor configuring a pixel circuit, in the display area DA. The data driver 114 and the controller 116 may be in the forms of individual integrated circuit chips or in the form of one integrated circuit chip, and arranged on the FPCB connected to one side of the substrate 100. According to some embodiments, the data driver 114 and the controller 116 may be arranged directly on the substrate 100 in a chip-on-plastic (COP) manner.

The touch driver TDC may detect a characteristic change (e.g., a capacitance change, a resistance change, an ultrasonic change, an infrared change, or a light change) of the touch sensor TS at a specific location, and transmit the characteristic change to the processor PRC. The touch driver TDC may receive, from the touch sensor TS, a voltage or current corresponding to the characteristic change and transmit, to the processor PRC, a location-specific characteristic change calculated based on the voltage or current, as touch detection data. The touch driver TDC may determine a touch and a touch location, based on the touch detection data. In this regard, the touch driver TDC may include a microprocessor (MPU) or a microcontroller (MCU).

The structure driver SDC may control movement of the stretching structure SS in response to a control signal from the processor PRC. The structure driver SDC may apply external force to the display panel DP by moving the stretching structure SS in the protruding direction, and a portion of the display panel DP may protrude while extending in a direction perpendicular to the substrate 100. The structure driver SDC may remove the external force that has been applied to the display panel DP by moving the stretching structure SS in the returning direction, and the display panel DP that has been stretched may be contracted and restored to a flat state before being stretched.

The camera CAM may capture a still image and a moving image. According to some embodiments, at least one camera CAM may be arranged on the display panel DP. According to some embodiments, at least one camera CAM may be arranged below the display panel DP. The camera CAM may include an image sensor. The image sensor may include a photoelectric conversion element such as a charge coupled device (CCD) or a complementary metal oxide semiconductor (CMOS). The camera CAM may output an electrical signal of the image sensor to the processor PRC. A lens and a color filter, which are configured to receive an optical signal, may be provided at the front end of the image sensor. According to some embodiments, the plurality of cameras CAM may be distributed at a location where a body part (e.g., a hand or a finger) of a user (driver) in a driver's seat may be detected and a location where a body part of a user (passenger) in a passenger's seat may be detected.

According to some embodiments, the camera CAM may be replaced with a proximity sensor or the camera CAM and the proximity sensor may be provided together. The proximity sensor is a sensor configured to detect presence of an object approaching a detection surface or an object nearby without a mechanical contact, by using force of an electromagnetic field or infrared rays.

When an event of the driver approaching the vehicle display apparatus 3 occurs, the feedback system FS may provide, to the driver, feedback through various tactile effects and/or audio signals that may be felt by the driver. The feedback system FS may include a haptic feedback generation device 312 and/or an audio output device 314.

The haptic feedback generation device 312 may include an actuator that is driven to generate haptic feedback. The haptic feedback generation device 312 may receive, from the processor PRC, a driving control signal for driving the actuator and output the haptic feedback. The haptic feedback may be provided to the user, in the form of vibration, touch, or heat in the vehicle display apparatus 3. According to some embodiments, the actuator may be linked to the mechanical unit SSL and the stretching structure SS may be moved by the actuator.

The audio output device 314 is a device configured to output an audio signal, and for example, may include a speaker used for a general purpose, such as multimedia reproduction or recording reproduction, and a receiver used exclusively to receive phone calls. According to some embodiments, the receiver may be integrated with or separated from the speaker. The audio output device 314 may receive the feedback control signal from the processor PRC and output feedback through an audio signal.

The processor PRC may include at least one of a central processing unit (CPU), or an application processor (AP). The processor PRC may further include at least one of a graphics processing unit (GPU), a communication processor (CP), or an image signal processor (ISP). The processor PRC may further include a neural processing unit (NPU). The NPU is a processor specialized in processing an artificial intelligence model, and the artificial intelligence model may be generated through machine learning. The artificial intelligence model may include a plurality of artificial neural network layers. An artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination thereof, but is not limited thereto. The artificial intelligence model may include, additionally or alternatively, a software structure, in addition to a hardware structure. The processor PRC may be implemented as a configuration (e.g., a single chip) in which at least two of the above-described processing units and processors are integrated, or implemented as configurations (e.g., a plurality of chips) in which the above-described processing units and processors are independent. The processor PRC may be implemented as a graphic card or a system-on-chip (SOC).

The processor PRC may control all operations of the vehicle display apparatus 3.

The processor PRC may detect an object approaching the vehicle display apparatus 3 and/or touching the vehicle display apparatus 3 by processing an image signal from the camera CAM. The processor PRC may identify a user by determining whether the detected object is a user in a driver's seat or a passenger in a passenger's seat. According to some embodiments, the processor PRC may identify the user, based on a location and/or a moving direction of the object detected from sequentially input image signals. A user identification method is not specifically limited and various methods of identifying a driver and a passenger may be used.

The processor PRC may determine a control mode of the vehicle display apparatus 3. The control mode may include a driver's seat control mode in a case where the identified user is a driver and a passenger's seat control mode in a case where the identified user is a passenger. The driver's seat control mode may be a feedback-on mode for providing, as feedback, a result of performing a function corresponding to a touch input of the driver. The passenger's seat control mode may be a feedback-off mode for not providing, as feedback, a result of performing a function corresponding to a touch input of the passenger. By providing feedback in the driver's seat control mode, the driver is able to control a function without having to directly look at the vehicle display apparatus 3, thereby reducing a risk of accidents. By not providing feedback in the passenger's seat control mode, power consumption of the vehicle display apparatus 3 may be reduced.

The processor PRC may generate a driving control signal in each of the driver's seat control mode and the passenger's seat control mode, and output the same to the structure driver SDC. According to some embodiments, the processor PRC may output, to the display driver DDC, image data to be displayed in an area (hereinafter, a protruding area) of the display panel DP protruding by the stretching structure SS.

The processor PRC may generate a feedback control signal in the driver's seat control mode and output the same to the feedback system FS.

In each of the driver's seat control mode and the passenger's seat control mode, the processor PRC may output an operation control signal for activating a function (e.g., a volume control, a temperature control, or a radio frequency control) corresponding to a touch input of the user, to a device (e.g., an audio output device, an air conditioner/heater, or a radio) configured to perform the function.

The vehicle display apparatus 3 may further include at least one sensor. The sensor may include a detection sensor configured to detect an environment (humidity, wind, or the like) inside and outside the vehicle, a fingerprint sensor, or the like. According to some embodiments, the processor PRC may additionally use fingerprint detection information from the processor PRC, for a process of identifying a user based on an image signal from the camera CAM. Fingerprint information of a driver and/or a passenger may be pre-registered in the vehicle display apparatus 3.

FIGS. 7A to 8B are diagrams schematically showing changes in the stretching structure SS and display panel DP, according to some embodiments. FIG. 9 is a cross-sectional view of the stretching structure SS and display panel DP, taken along the line I-I' of FIG. 8B, and a plan view of a protruding area PDA.

The stretching structure SS may include at least one pin PN. According to some embodiments, the pin PN may have a cylindrical shape. A portion of the pin PN, which faces the display panel DP, may have a flat surface or a 3-dimensionally rounded surface such as a hemispherical surface. The pin PN may move perpendicular to the rear surface of the display panel DP in the protruding direction (①) and the returning direction (②). The pin PN may move perpendicularly by a physical moving unit, such as an actuator.

Figure 7A:
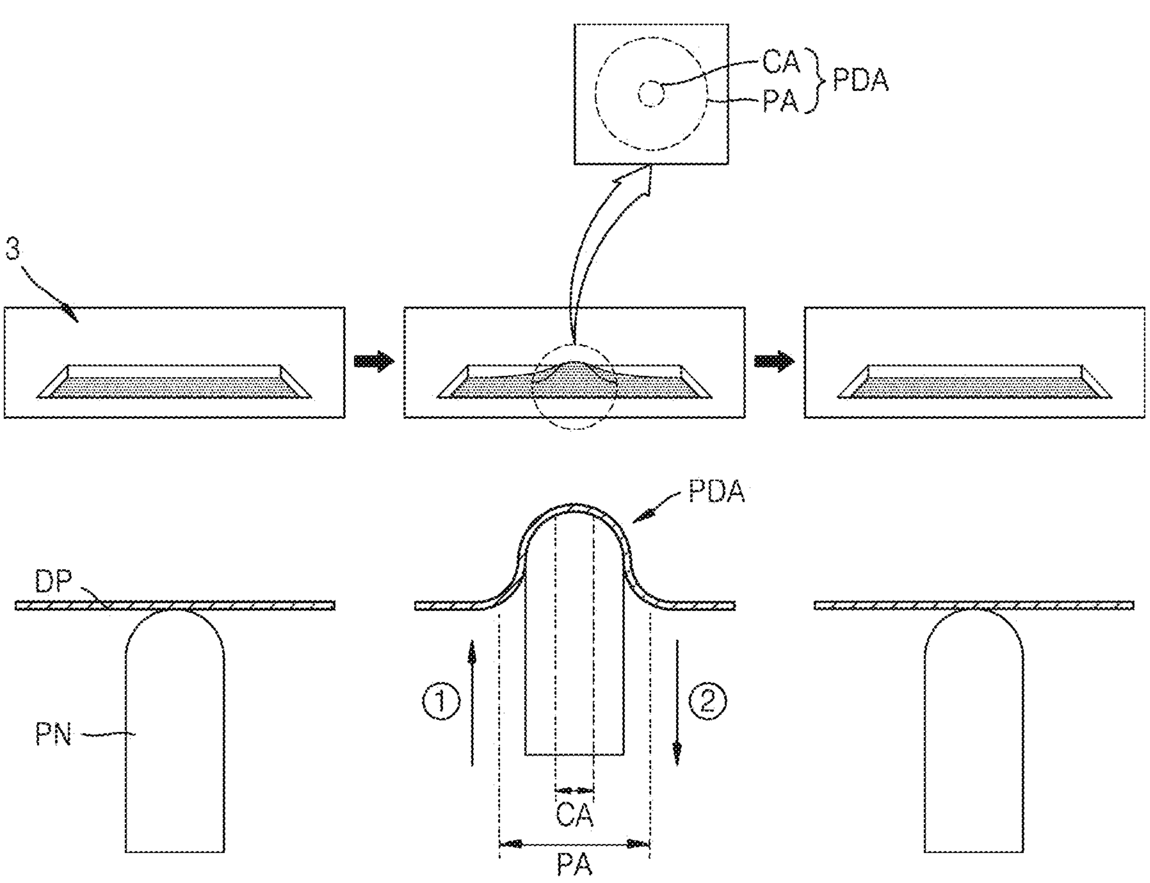
FIGS. 7A to 8B are diagrams schematically showing changes in a stretching structure and display panel, according to some embodiments.

Before the pin PN moves (i.e., before the display panel DP protrudes), an upper surface of the pin PN may be spaced apart from the display panel DP with a gap of a certain interval or may be in contact with the rear surface of the display panel DP. The protruding area PDA having a certain height may be defined in the display area DA of the display panel DP according to movement of the pin PN in the protruding direction (①). The protruding area PDA may include a central area CA having a greatest protruding height from a non-protruding surface of the display panel DP, and a peripheral area PA surrounding the central area CA. The central area CA may include a vertex of the protruding area PDA. The peripheral area PA may be an inclining surface of which a protruding height gradually decreases away from the central area CA in all directions from the central area CA. FIG. 7A illustrates an example in which the central area CA and the peripheral area PA surrounding the central area CA are circles in a plan view. Embodiments according to the present disclosure are not limited thereto, and the shape of the protruding area PDA and the shapes of the central area CA and peripheral area PA in a plan view may have any one of various shapes, such as a rectangle, a polygon, and an oval.

Figure 7B:
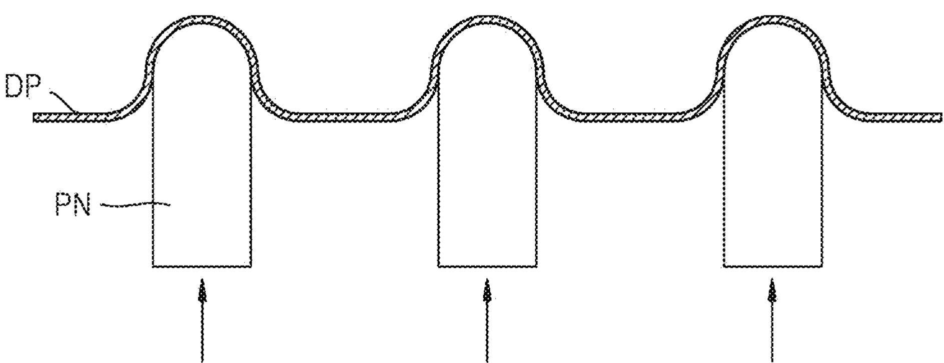

According to some embodiments, the stretching structure SS may include one pin PN as shown in FIG. 7A or two or more pins PN that are spaced apart from each other at a certain interval as shown in FIG. 7B. One pin PN may correspond to one protruding area PDA. When the pin PN moves in the protruding direction, the protruding area PDA of the display panel DP may expand and protrude in the protruding direction. FIG. 7B illustrates the stretching structure SS including three pins PN and three protruding areas PDA corresponding to locations of the three pins PN.

Figure 8A:
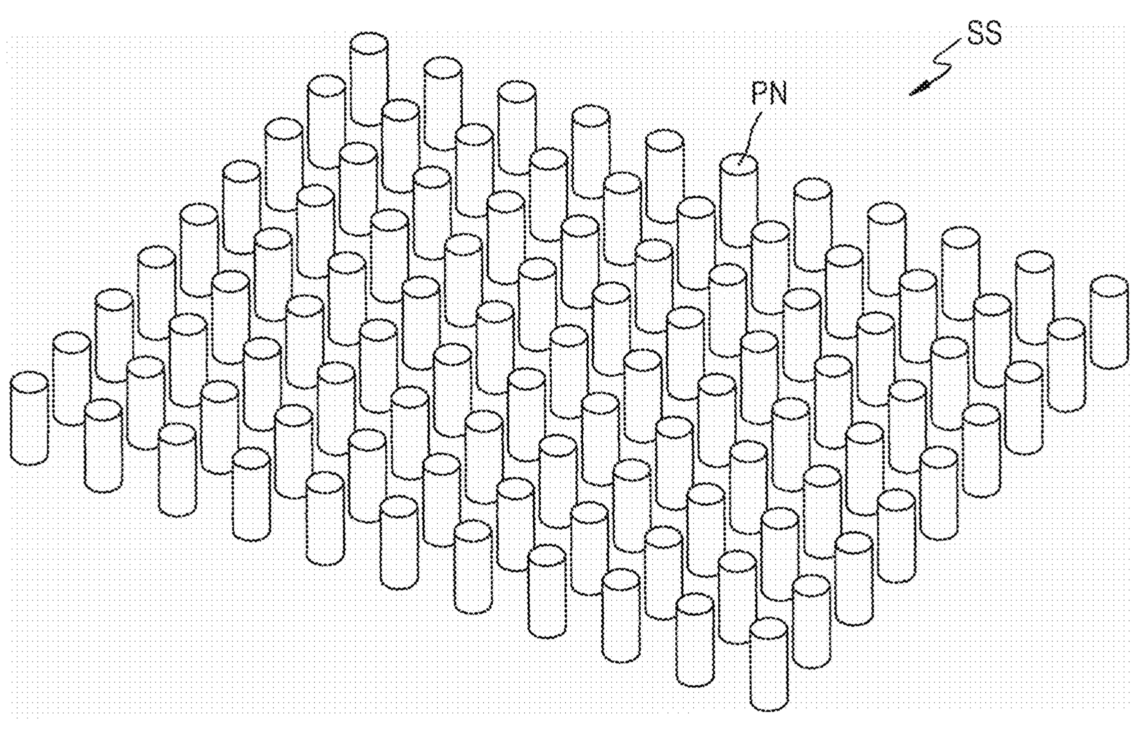
Figure 8B:
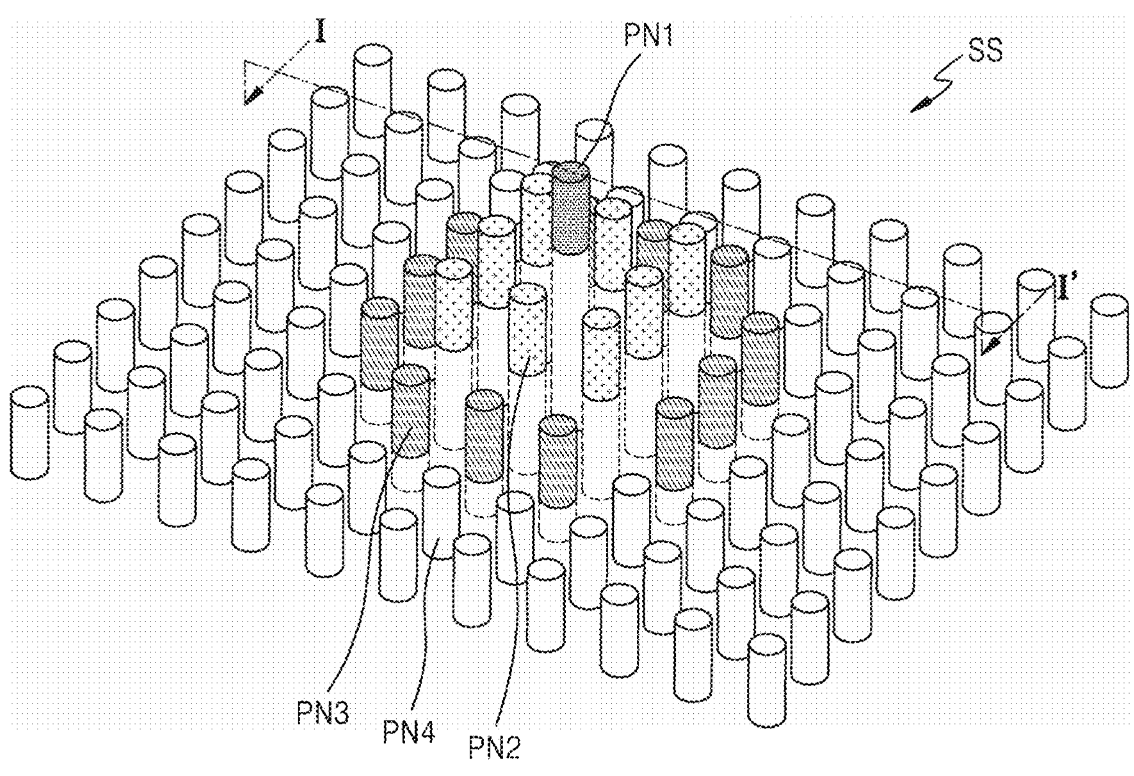
Figure 9:
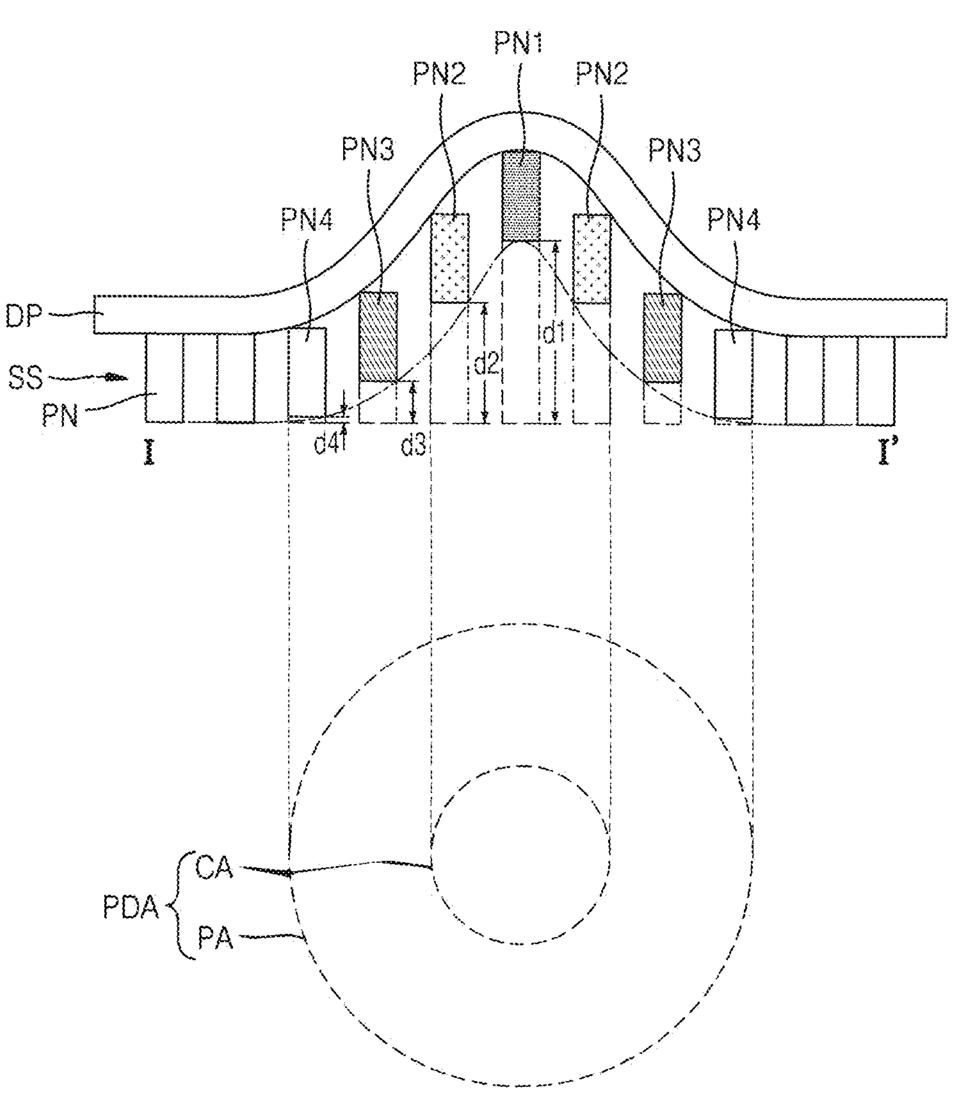
FIG. 9 is a cross-sectional view of the stretching structure and display panel, taken along the line I-I' of FIG. 8B.

According to some embodiments, the stretching structure SS may be an embossing structure in which the plurality of pins PN are arranged as shown in FIGS. 8A and 8B. As shown in FIG. 8B, the plurality of pins PN may correspond to one protruding area PDA. When the pins PN arranged in the protruding area PDA move in the protruding direction, the protruding area PDA of the display panel DP may expand and protrude in the protruding direction.

The pins PN arranged in the protruding area PDA may include a center pin PN1 and peripheral pins PN2, PN3, and PN4 having shorter protruding heights (moving distances) away from the center pin PN1. Among the pins PN arranged in the protruding area PDA, a protruding height (a moving distance) of the center pin PN1 may be the longest, and the protruding heights (moving distances) of the peripheral pins PN2, PN3, and PN4 around the center pin PN1 may decrease away from the center pin PN1. Accordingly, the protruding area PDA may have shape including an inclining surface. In FIG. 8B, for convenience of understanding, some pins among the center pin PN1 and the peripheral pins PN2, PN3, and PN4 of the protruding area PDA are marked for distinction.

The central area CA of the protruding area PDA may include at least an area corresponding to a location of the center pin PN1. According to some embodiments, as shown in FIG. 9, the central area CA may correspond to the locations of the center pin PN1 and peripheral pin PN2 most adjacent to the center pin PN1, and the peripheral area PA may correspond to the locations of the remaining peripheral pins PN3 and PN4. A range (the number) of pins corresponding to the central area CA and peripheral area PA may vary depending on a pin arrangement shape, a pin arrangement interval, a pin structure (a thickness of a pin, a shape of a pin, or the like), or the like.

FIGS. 10A to 11C are diagrams schematically showing a camera arrangement according to some embodiments. At least one camera CAM may be integrated with the vehicle display apparatus 3.

Figure 10A:
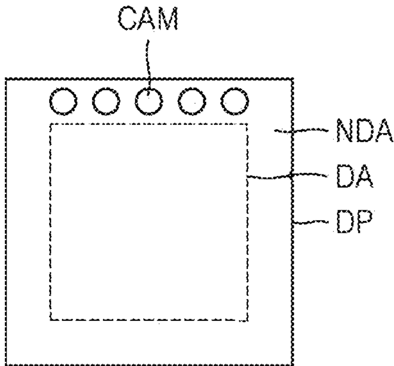
FIGS. 10A to 11C are diagrams schematically showing a camera arrangement according to some embodiments.
Figure 10B:
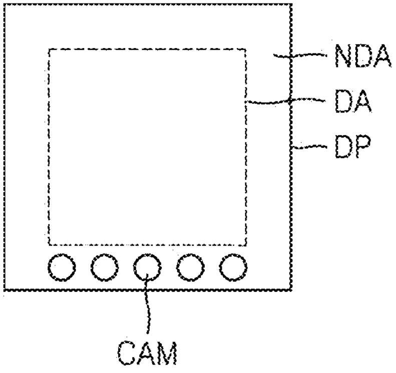
Figure 10C:
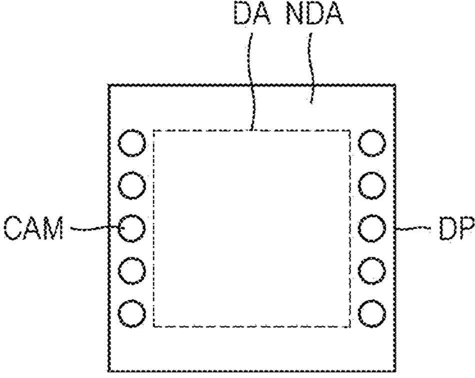

As shown in FIGS. 10A to 10C, the at least one camera CAM may be arranged above the display panel DP. The at least one camera CAM may be arranged according to the non-display area NDA of the display panel DP. FIG. 10A illustrates an example in which the at least one camera CAM is located according to the non-display area NDA above, FIG. 10B illustrates an example in which the at least one camera CAM is located according to the non-display area NDA below, and FIG. 10C illustrates an example in which the at least one camera CAM is located according to the non-display area NDA on left and right sides. Embodiments according to the present disclosure are not limited thereto, and the at least one camera CAM may be appropriately distributed at optimal locations in the non-display area NDA for detecting a driver and a passenger.

Figure 11A:
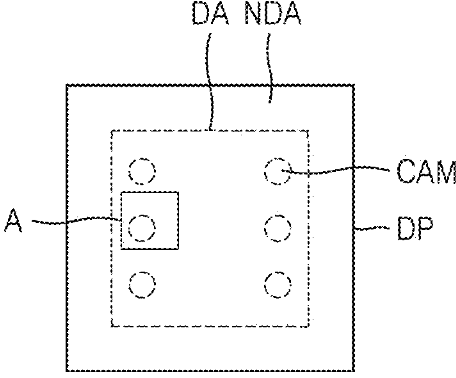
Figure 11B:
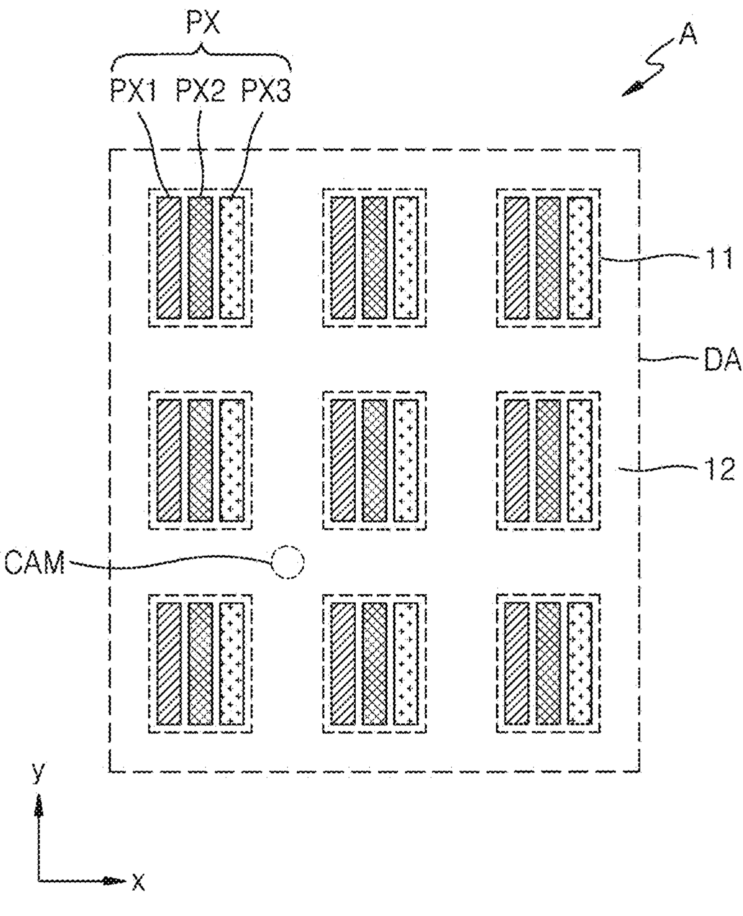
Figure 11C:
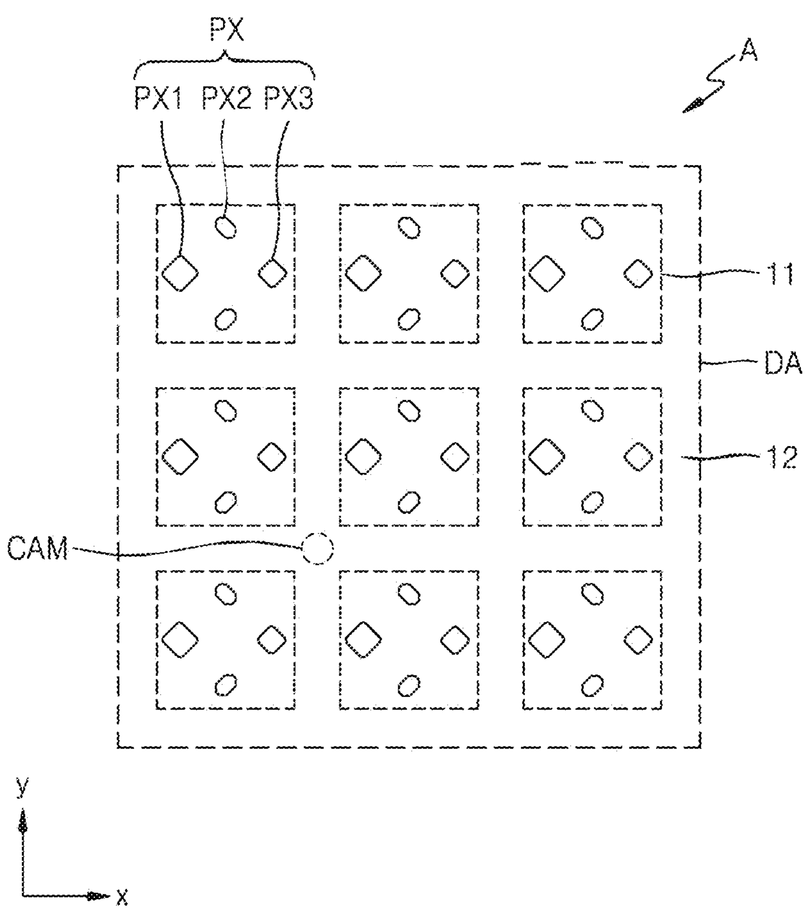

The at least one camera CAM may be arranged below the display panel DP. As shown in FIGS. 11A to 11C, the at least one camera CAM may be arranged in the display area DA of the display panel DP. The FIGS. 11B and 11C show an area A of FIG. 11A. Alternatively, the at least one camera CAM may be arranged in the display area DA and the non-display area NDA. According to some embodiments, the at least one camera CAM may be arranged below the substrate 100 of the display panel DP.

The display area DA may include first areas 11 and a second area 12 between the first areas 11. The plurality of sub-pixels configuring the pixel PX may be arranged in the first area 11. The second area 12 may be a transmissive area. Signal lines (e.g., a gate line, a data line, and a voltage line) configured to provide signals to the pixels PX arranged in the first areas 11 may be arranged in the second area 12. At least one inorganic insulating layer and at least one organic insulating layer of the display panel DP may be removed from the second area 12.

According to some embodiments, as shown in FIG. 11B, the sub-pixels may be arranged in a stripe structure in the display area DA, and the pixel PX may include one first sub-pixel PX1, one second sub-pixel PX2, and one third sub-pixel PX3. According to some embodiments, as shown in FIG. 11C, the sub-pixels may be arranged in a Pentile® structure in the display area DA, and the pixel PX may include one first sub-pixel PX1, two second sub-pixels PX2, and one third sub-pixel PX3.

As shown in FIGS. 11B and 11C, the at least one camera CAM may be arranged according to the second area 12 and thus may not overlap the sub-pixels. The at least one camera CAM may not overlap the light-emitting element and pixel circuit of the sub-pixel. The at least one camera CAM may not overlap the signal line of the second area 12.

Figure 12:
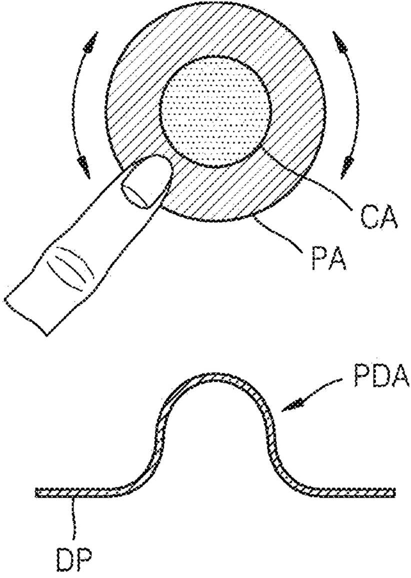
FIGS. 12 and 13 are diagrams schematically showing a touch on a protruding area of a display panel for function control, according to some embodiments.
Figure 13:
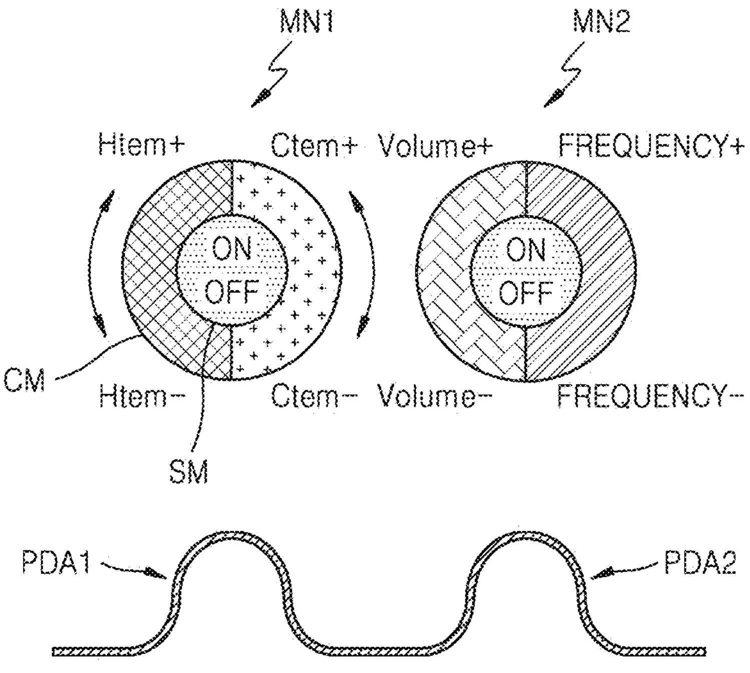

FIGS. 12 and 13 are diagrams schematically showing a touch on the protruding area PDA of the display panel DP for function control, according to some embodiments.

Referring to FIG. 12, a user may control a specific function by touching and/or dragging the protruding area PDA of the display panel DP. The user may select turning on or off a function by touching the central area CA. When the function is turned on, the user may adjust a range of the function by dragging the peripheral area PA up and down. Here, the term “touch” indicates a state in which a finger of the user, a stylus pen, or the like is in contact with the display panel DP. Also, the term “drag” indicates an operation of moving a touch point while maintaining a touch on the display panel DP. For example, the user may adjust the range of the function by sliding the peripheral area PA up and down in directions indicated by arrows while touching a portion of the peripheral area PA. According to some embodiments, there may be a plurality of functions, such as a volume control, a temperature control, and a radio frequency control, and at least one protruding area PDA may be provided for the plurality of functions.

For example, as shown in FIG. 13, a first protruding area PDA1 and a second protruding area PDA2 may protrude from the display panel DP. The first protruding area PDA1 may function as a user interface for a temperature control function, and the second protruding area PDA2 may function as a user interface for a volume control function and a radio frequency control function.

When the user touches the central area CA of the first protruding area PDA1, on/off of a heater and an air conditioner may be selected. When the user drags the left peripheral area PA up and down, a temperature of the heater may be increased and decreased (Htem+ and Htem−). When the user drags the right peripheral area PA up and down, a temperature of the air conditioner may be increased and decreased (Ctem+ and Ctem−).

When the user touches the central area CA of the second protruding area PDA2, on/off of volume and on/off of a radio may be selected. When the user drags the left peripheral area PA up and down, the volume may be increased and decreased (Volume+ and Volume−). When the user drags the right peripheral area PA up and down, a radio frequency may be increased and decreased (Frequency+ and Frequency−).

According to some embodiments, a menu icon MN may be provided in each protruding area PDA before and/or after the display panel DP protrudes. FIG. 13 illustrates examples of a first menu icon MN1 corresponding to the first protruding area PDA1 and a second menu icon MN2 corresponding to the second protruding area PDA2. The first menu icon MN1 may be a user interface for a temperature control function, and the second menu icon MN2 may be a user interface for a volume control function and a radio frequency control function.

The menu icon MN may include a switch menu SM for selecting on/off of a function, and a control menu CM for controlling a range of the function. The control menu CM may surround the switch menu SM. The switch menu SM may correspond to the central area CA of the protruding area PDA, and the control menu CM may correspond to the peripheral area PA of the protruding area PDA. By providing the menu icon MN, the user may easily recognize a location to be touched to control a specific function. The processor PRC may determine a touch on the central area CA of the protruding area PDA and a touch on the switch menu SM of the menu icon MN to be an input signal for performing a same function, and determine a drag of the peripheral area PA of the protruding area PDA and a drag of the control menu CM of the menu icon MN to be an input signal for performing a same function.

The user interface of the menu icon MN shown in FIG. 13 is only an example, and various types of user interfaces may be provided for user convenience. The menu icon MN may be selectively provided, and thus, the menu icon MN may not be provided to the display panel DP in consideration of power consumption.

Figure 14:
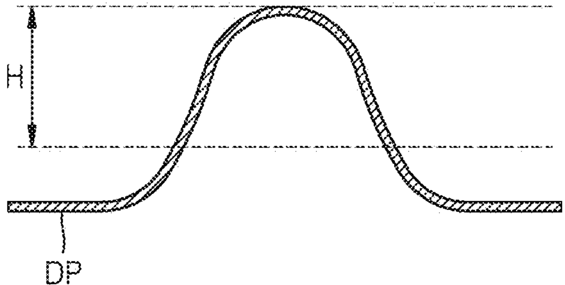
FIG. 14 is a diagram for describing an operation of a feedback system, according to some embodiments.

FIG. 14 is a diagram for describing an operation of a feedback system, according to some embodiments.

According to some embodiments, the vehicle display apparatus 3 may be configured to provide haptic feedback and/or audio feedback for a touch input on a certain area among the protruding area PDA of the display panel DP. For example, as shown in FIG. 14, the vehicle display apparatus 3 may provide haptic feedback and/or audio feedback when a touch input is detected in an area H which is between a center of the protruding area PDA and a location of a certain height from the non-protruding surface of the display panel DP.

According to some embodiments, haptic feedback and/or audio feedback may be controlled according to a range control of a function. For example, when the peripheral area PA of the protruding area PDA is dragged upward for a volume control, vibration may be increased and/or an audio message such as “volume up” may be output. Through such feedback, the user may recognize whether a desired volume control function is being appropriately controlled without having to look at the vehicle display apparatus 3. When the user determines that the volume control is not performed according to his/her desire, through the feedback, the user may touch the peripheral area PA again and receive feedback again.

Figure 15:
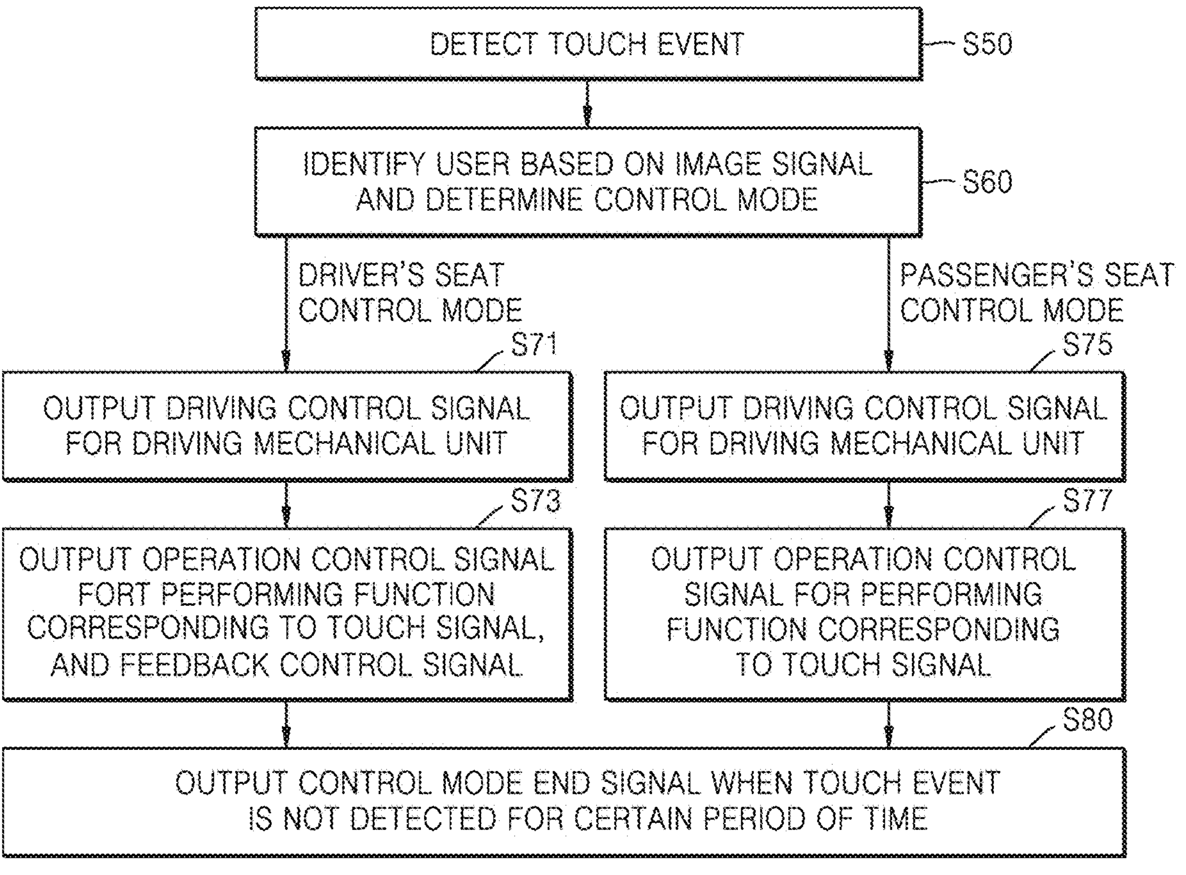
FIG. 15 is a diagram schematically showing aspects of a control method of a vehicle display apparatus, according to some embodiments.

FIG. 15 is a diagram schematically showing aspects of a control method of the vehicle display apparatus 3, according to some embodiments. Although FIG. 15 illustrates various operations in a control method of the vehicle display apparatus, embodiments according to the present disclosure are not limited thereto, and according to various embodiments, the method may include additional operations, or fewer operations, or the order of operations may vary, unless otherwise stated or implied, without departing from the spirit and scope of embodiments according to the present disclosure.

FIG. 15 illustrates the control method performed by the processor PRC of the vehicle display apparatus 3, and hereinafter, detailed descriptions that overlap those described with reference to FIGS. 1 to 14 will not be provided again.

When a touch event on the display panel DP is detected (operation S50), the processor PRC may identify a user touching the display panel DP, based on an image signal input from the camera CAM, and determine a control mode according to the identified user (operation S60).

The touch event may include a direct touch of the user on the display panel DP or a case where a body part of the user approaches within a certain distance towards the display panel DP for a touch. The touch event may be detected based on a touch input on the touch sensor TS or based on the image signal obtained by the camera CAM. According to some embodiments, when the display panel DP includes a proximity sensor, the touch event may be detected based on detection data of the proximity sensor.

According to some embodiments, the camera CAM may periodically obtain the image signal while a vehicle is being operated (driving and stopping) and provide the image signal to the processor PRC. According to some embodiments, when an object is detected in a standby mode of the camera CAM, the camera CAM may switch to a wakeup mode and then periodically obtain the image signal and provide the same to the processor PRC.

The processor PRC may extract the user by processing the image signal from the camera CAM and identify the extracted user. When the extracted user is identified as a driver, the processor PRC may switch to a driver's seat control mode, and when the extracted user is identified as a passenger, the processor PRC may switch to a passenger's seat control mode.

According to some embodiments, the processor PRC may verify the identified user by comparing fingerprint detection information from a fingerprint sensor with a pre-registered user fingerprint.

In the driver's seat control mode, the processor PRC may generate a driving control signal for driving the mechanical unit SSL and output the same to the structure driver SDC (operation S71).

According to some embodiments, the processor PRC may generate a display control signal for providing the menu icon MN and output the same to the display driver DDC before detecting the touch event and/or simultaneously or after outputting the driving control signal. The processor PRC may output image data corresponding to at least one menu icon MN to the display driver DDC.

The structure driver SDC may start driving the stretching structure SS in response to the driving control signal and control movement of the stretching structure SS. The stretching structure SS (at least one pin PN) located in at least one protruding area PDA pre-set in the display panel DP may move by a pre-set distance. The protruding area PDA of the display panel DP may stretch and protrude according to an operation of the stretching structure SS.

Selectively, the display driver DDC may provide the image data to the at least one protruding area PDA in response to the display control signal so that the display panel DP displays the menu icon MN.

The processor PRC may generate and output an operation control signal for performing a function corresponding to a touch signal input from the touch driver TDC, and a feedback control signal (operation S73).

The processor PRC may receive, from the touch driver TDC, the touch signal including whether there is a touch and a touch location. The processor PRC may determine a touch type from the touch signal and determine the function corresponding to the touch signal, based on the touch location and the touch type. The touch type may include a touch and a drag. The processor PRC may output, to a device for performing the function, the operation control signal for turning on/off the function assigned to the touched protruding area PDA and controlling a range of the function.

The processor PRC may generate the feedback control signal for feedback output set for the performing of the function, and output the same to the feedback system FS. The feedback system FS may output haptic feedback and/or audio feedback according to the feedback control signal.

The processor PRC may generate and output a control mode end signal when the touch event is not detected for a certain period of time (operation S80). The processor PRC may generate the control mode end signal and output the same to the structure driver SDC and the display driver DDC when there is no user detection in the image signal from the camera CAM for a certain period of time and/or when there is no touch input from the touch sensor TS for a certain period of time. The structure driver SDC may control movement of the stretching structure SS in response to the control mode end signal and the display panel DP may be restored to a flat state. The display driver DDC may not provide the image data to the display panel DP in response to the control mode end signal, and thus, the menu icon MN may not be displayed on the display panel DP.

Operations of the processor PRC in the passenger's seat control mode are the same those in the driver's seat control mode except that feedback is not provided to the user, and thus, detailed descriptions thereof are omitted.

In the passenger's seat control mode, the processor PRC may generate the driving control signal and output the same to the structure driver SDC (operation S75), and the structure driver SDC may control movement of the stretching structure SS in response to the driving control signal and at least one protruding area PDA of the display panel DP may protrude by operations of the stretching structure SS.

According to some embodiments, the processor PRC may output the image data and the display control signal to the display driver DDC before detecting the touch event and/or simultaneously or after outputting the driving control signal, and the menu icon MN may be displayed on the at least one protruding area PDA.

The processor PRC may generate and output the operation control signal for performing the function corresponding to the touch signal input from the touch driver TDC (operation S77). The processor PRC may determine the function corresponding to the touch signal, based on the touch location and the touch type, and output, to the device for performing the function, the operation control signal for turning on/off the function assigned to the touched protruding area PDA and controlling the range of the function.

The processor PRC may generate and output the control mode end signal when the touch event is not detected for a certain period of time (operation S80). The structure driver SDC may control movement of the stretching structure SS in response to the control mode end signal and the display panel DP may be restored to the flat state. The display driver DDC may not provide the image data to the display panel DP in response to the control mode end signal, and thus, the menu icon MN may not be displayed on the display panel DP.

Figure 16:
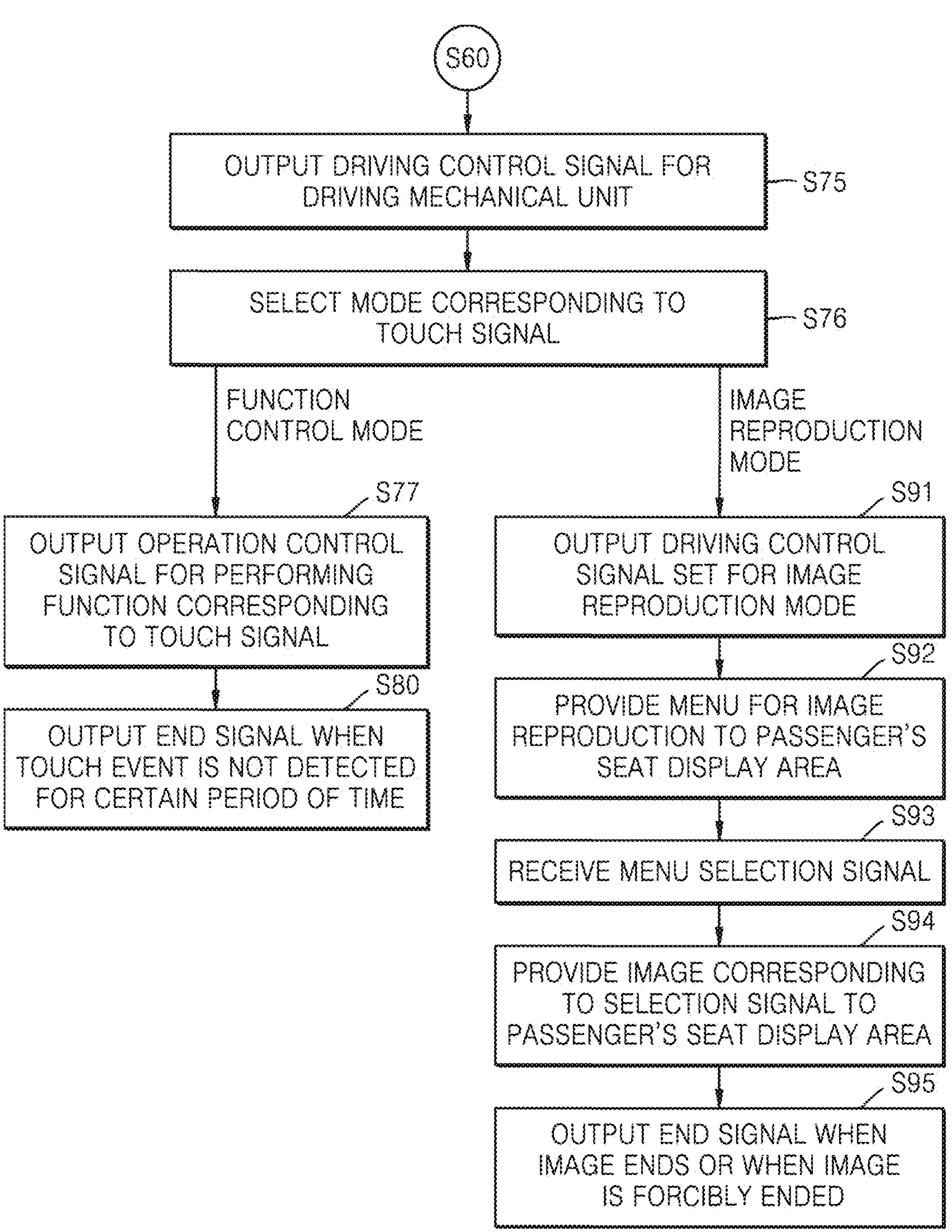
FIG. 16 is a diagram schematically showing aspects of a control method of a vehicle display apparatus, according to some embodiments.

FIG. 16 is a diagram schematically showing a control method of the vehicle display apparatus 3, according to some embodiments. Although FIG. 16 illustrates various operations in a control method of the vehicle display apparatus, embodiments according to the present disclosure are not limited thereto, and according to various embodiments, the method may include additional operations, or fewer operations, or the order of operations may vary, unless otherwise stated or implied, without departing from the spirit and scope of embodiments according to the present disclosure.

Figure 17:
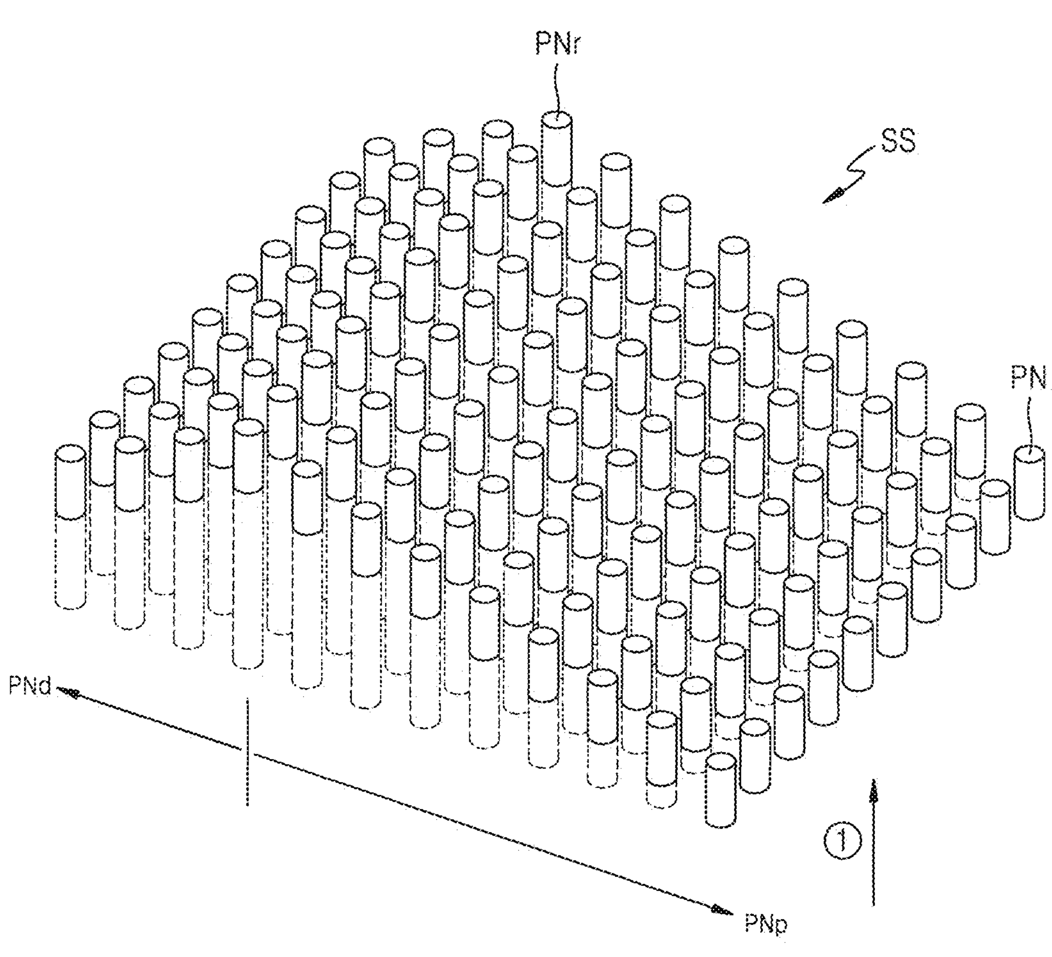
FIG. 17 is a diagram schematically showing a change in a stretching structure, according to some embodiments.
Figure 18:
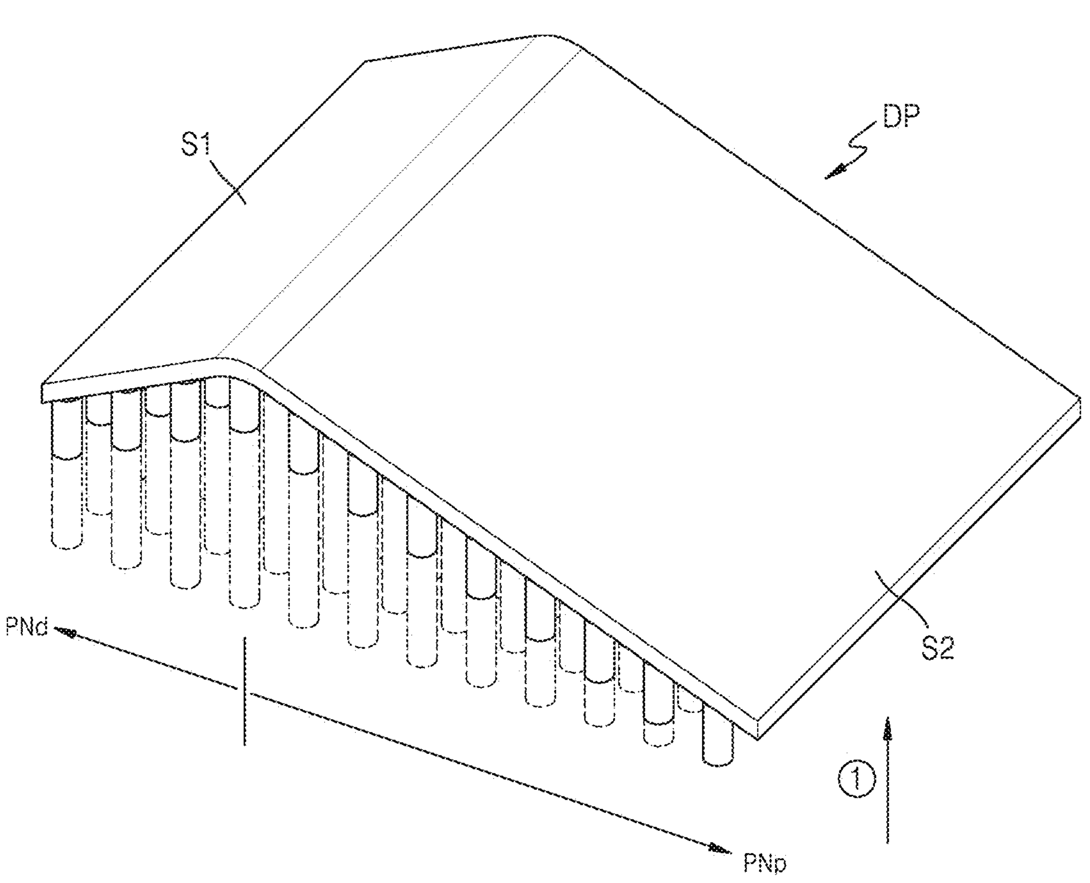
FIG. 18 is a diagram schematically showing a change in a display panel, according to some embodiments.

FIG. 17 is a diagram schematically showing a change in the stretching structure SS, according to some embodiments. FIG. 18 is a diagram schematically showing a change in the display panel DP, according to some embodiments.

FIG. 16 illustrates embodiments in which the passenger's seat control mode includes a function control mode and an image reproduction mode by the processor PRC of the vehicle display apparatus 3. Hereinafter, descriptions about operations of the driver's seat control mode are omitted.

Referring to FIG. 16, when the control mode is determined to be the passenger's seat control mode (operation S60) as shown in FIG. 15, the processor PRC may generate the driving control signal for driving the mechanical unit SSL and output the same to the structure driver SDC (operation S75). The stretching structure SS moves under control by the structure driver SDC and at least one protruding area PDA of the display panel DP may protrude.

The protruding area PDA may include at least one protruding area for function control and a protruding area for entertainment reproduction. The protruding area for entertainment reproduction may be a user interface for selecting a moving image such as DMB or a movie.

According to some embodiments, the processor PRC may generate the display control signal for providing a menu icon and output the same to the display driver DDC before detecting the touch event and/or simultaneously or after outputting the driving control signal. The processor PRC may output the image data corresponding to at least one menu icon to the display driver DDC. The menu icon corresponding to each protruding area PDA may include a control function menu icon and an entertainment menu icon. The entertainment menu icon may be a user interface for selecting a moving image such as DMB or a movie.

The processor PRC may receive, from the touch driver TDC, the touch signal corresponding to the touch input on the protruding area PDA and determine the function control mode or the image reproduction mode (operation S76).

In the function control mode, the processor PRC may generate the operation control signal for performing the function corresponding to the touch signal and output the same to the device for performing the function, as described with reference to FIG. 15 (operation S77). The processor PRC may generate the control mode end signal when the touch event is not detected for a certain period of time, and output the same to the structure driver SDC and the display driver DDC (operation S80).

In the image reproduction mode, the processor PRC may generate a driving control signal set for the image reproduction mode and output the same to the structure driver SDC (operation S91). Under control by the structure driver SDC, a reference pin PNr, pins PNd in the driver's seat, and pins PNp in the passenger's seat may each move by a pre-set distance in the protruding direction (①) from the rear surface of the display panel DP, based on the reference pin PNr having the greatest protruding height (moving distance) from the stretching structure SS, as shown in FIG. 17.

As shown in FIG. 18, the display panel DP on the stretching structure SS may be stretched by the moving distances of the pins PN in the protruding direction (①), and provide a driver's seat display area S1 inclined towards the driver's seat and a passenger's seat display area S2 inclined towards the passenger's seat, based on an area corresponding to a location of the reference pin PNr. The passenger's seat display area S2 may have a greater area than the driver's seat display area S1. An inclination of the passenger's seat display area S2 may be less than an inclination of the driver's seat display area S1.

The processor PRC may provide a menu for image reproduction to the passenger's seat display area S2 (operation S92), and receive, from the touch driver TDC, a touch signal corresponding to selecting of the menu (operation S93).

The processor PRC may provide an image according to the menu selected based on the touch signal, to the passenger's seat display area S2 (operation S94). While the image is provided to the passenger's seat display area S2, a display function may be turned off in the driver's seat display area S1 or at least one piece of information other than the image may be provided to the driver's seat display area S1. For example, as shown in FIG. 15, when the touch event is detected (operation S50), the processor PRC may identify the user based on the image signal from the camera CAM, switch to the driver's seat control mode when the user is a driver (operation S60), and perform operations S71 to S80 on the driver's seat display area S1 according to the driver's seat control mode. At least one protruding area PDA may protrude from the driver's seat display area S1 by the stretching structure SS, and the processor PRC may control performing of a function corresponding to a touch input of the driver on the protruding area PDA.

The processor PRC may generate and output an end signal when the image ends and/or when the image is forcibly ended (operation S95).

The driver's seat display area S1 and the passenger's seat display area S2 may provide content of different functions according to control by the vehicle display apparatus 3, according to FIG. 16.

According to some embodiments, a function control (a temperature control, a volume control, a radio frequency control, or the like) in a vehicle may be performed by using a stretchable display apparatus configured to receive a touch input, and thus, the weight of the vehicle may be reduced and fuel efficiency may be relatively improved compared to a control function using mechanical parts.

According to some embodiments, a driver may use an operating unit (protruding area) of a display apparatus while looking ahead, by using a feedback system and a freely transformable stretchable display apparatus that identifies the driver by using an image signal.

According to some embodiments, provided is a display apparatus in which control of an in-vehicle device may be safely performed without interfering with driving of a driver. Obviously, the scope of the disclosure is not limited by such effects.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims, and their equivalents.

What is claimed is:

1. A vehicle display apparatus comprising:

a camera;

a stretchable display panel including a touch sensor;

a mechanical unit including at least one pin configured to move in a perpendicular direction with respect to a rear surface of the stretchable display panel; and a processor configured to control operations of the stretchable display panel and the mechanical unit, wherein the processor is further configured to:

identify a user touching the stretchable display panel, based on an image signal obtained from the camera, and determine a driver's seat control mode or a passenger's seat control mode according to the identified user;

in the driver's seat control mode and the passenger's seat control mode, output a driving control signal for controlling movement of the at least one pin of the mechanical unit;

output an operation control signal for performing a function corresponding to a touch of the user input to a protruding area of the stretchable display panel according to the movement of the at least one pin; and in the driver's seat control mode, further output a feedback control signal for feedback output set for the performing of the function, wherein the protruding area includes a central area having a greatest height and a peripheral area around the central area, wherein the peripheral area has a height gradually decreasing from the central area to include an inclining surface, and wherein the processor is further configured to output the operation control signal for controlling on or off of the function in response to a touch on the central area and to output the operation control signal for controlling a range of the function in response to dragging on the peripheral area.

2. The vehicle display apparatus of claim 1, wherein the function comprises at least one of temperature control, volume control, or radio frequency control.

3. The vehicle display apparatus of claim 1, wherein the mechanical unit comprises a single pin located according to the protruding area.

4. The vehicle display apparatus of claim 1, wherein the mechanical unit comprises at least one first pin located according to the central area of the protruding area, and a plurality of second pins located according to the peripheral area, wherein a moving distance of the at least one first pin is greater than a moving distance of the plurality of second pins.

5. The vehicle display apparatus of claim 1, wherein the camera is arranged above the stretchable display panel or below the stretchable display panel.

6. The vehicle display apparatus of claim 1, wherein the touch sensor comprises at least one of a capacitive touch sensor, a resistive touch sensor, an acoustic wave touch sensor, an infrared touch sensor, or a pressure touch sensor.

7. The vehicle display apparatus of claim 2, wherein the function further comprises image reproduction.

8. The vehicle display apparatus of claim 7, wherein, in the passenger's seat control mode, based on the function corresponding to the touch of the user input to the protruding area of the stretchable display panel being the image reproduction, the processor is further configured to output the driving control signal for controlling the movement of the at least one pin of the mechanical unit, and the stretchable display panel is changed to provide a first display area inclined towards a driver's seat and a second display area inclined towards a passenger's seat, according to the movement of the at least one pin.

9. A control method of a vehicle display apparatus, wherein the vehicle display apparatus comprises:

a camera;

a stretchable display panel including a touch sensor; and a mechanical unit including at least one pin configured to move in a perpendicular direction with respect to a rear surface of the stretchable display panel, the control method comprising:

identifying a user touching the stretchable display panel, based on an image signal obtained from the camera, and determining a driver's seat control mode or a passenger's seat control mode according to the identified user;

in the driver's seat control mode, outputting a driving control signal for controlling movement of the at least one pin of the mechanical unit; and in the driver's seat control mode, outputting an operation control signal for performing a function corresponding to a touch of the user input to a protruding area of the stretchable display panel according to the movement of the at least one pin, and a feedback control signal for feedback output set for the performing of the function, wherein the protruding area includes a central area having a greatest height and a peripheral area around the central area, wherein the peripheral area has a height gradually decreasing from the central area to include an inclining surface, and wherein outputting the operation control signal comprises outputting the operation control signal for controlling on or off of the function in response to a touch on the central area and outputting the operation control signal for controlling a range of the function in response to dragging on the peripheral area.

10. The control method of claim 9, wherein in the passenger's seat control mode, the feedback control signal is not output.

11. The control method of claim 9, wherein the function comprises at least one of temperature control, volume control, or radio frequency control.

12. The control method of claim 9, wherein the mechanical unit comprises a single pin located according to the protruding area.

13. The control method of claim 9, wherein the mechanical unit comprises at least one first pin located according to the central area of the protruding area, and a plurality of second pins located according to the peripheral area, wherein a moving distance of the at least one first pin is greater than a moving distance of the plurality of second pins.

14. The control method of claim 9, wherein the camera is arranged above the stretchable display panel or below the stretchable display panel.

15. The control method of claim 11, wherein the touch sensor comprises at least one of a capacitive touch sensor, a resistive touch sensor, an acoustic wave touch sensor, an infrared touch sensor, or a pressure touch sensor.

16. The control method of claim 11, wherein the function further comprises image reproduction, and the control method further comprises:

in the passenger's seat control mode, based on the function corresponding to the touch of the user input to the protruding area of the stretchable display panel being the image reproduction, outputting the driving control signal for controlling the movement of the at least one pin of the mechanical unit; and providing an image according to user selection to a second display area of the stretchable display panel that is changed to provide a first display area inclined towards a driver's seat and the second display area inclined towards a passenger's seat, according to the movement of the at least one pin.

* * * * *